(12) United States Patent
Shahar et al.

(10) Patent No.: US 7,123,401 B2
(45) Date of Patent: Oct. 17, 2006

(54) ALL OPTICAL PHASE INSENSITIVE WAVELENGTH CONVERTERS, APPARATUS SYSTEMS AND METHODS

(75) Inventors: Arie Shahar, Rye Brook, NY (US); Eldan Halberthal, Rye Brook, NY (US)

(73) Assignee: Main Street Ventures, LLC, White Plains, NY (US)

( * ) Notice: Subject to any disclaimer, the term of this patent is extended or adjusted under 35 U.S.C. 154(b) by 189 days.

(21) Appl. No.: 10/845,149

(22) Filed: May 14, 2004

(65) Prior Publication Data
US 2004/0233513 A1 Nov. 25, 2004

Related U.S. Application Data

(63) Continuation-in-part of application No. 10/834,343, filed on Apr. 29, 2004, and a continuation-in-part of application No. 10/827,314, filed on Apr. 20, 2004, and a continuation-in-part of application No. 10/826,363, filed on Apr. 19, 2004, and a continuation-in-part of application No. 10/472,244, filed on Sep. 22, 2003, and a continuation-in-part of application No. 10/640,035, filed on Aug. 14, 2003, and a continuation-in-part of application No. 10/640,018, filed on Aug. 14, 2003, and a continuation-in-part of application No. 10/640,017, filed on Aug. 14, 2003, and a continuation-in-part of application No. 10/640,040, filed on Aug. 14, 2003, now Pat. No. 6,956,998.

(60) Provisional application No. 60/472,137, filed on May 21, 2003, provisional application No. 60/467,563, filed on May 5, 2003, provisional application No. 60/465,237, filed on Apr. 25, 2003, provisional application No. 60/464,351, filed on Apr. 22, 2003, provisional application No. 60/405,679, filed on Aug. 22, 2002.

(51) Int. Cl.
*G02F 1/35* (2006.01)
(52) U.S. Cl. .................................... 359/326
(58) Field of Classification Search ......... 359/326–332
See application file for complete search history.

(56) References Cited

U.S. PATENT DOCUMENTS 5,673,140 A * 9/1997 Fisher .................... 359/332

OTHER PUBLICATIONS

O'Neill et al, "All-Optical Loop Mirror Switch Employing An Asymmetric Amplifier/Attenuator Combination", Electronics Letters, vol. 26, No. 24, Nov. 22, 1990, pp. 2008-2009.*
Eiselt, "Optical Loop Mirror With Semiconductor Laser Amplifier", Electronics Letters, vol. 28, No. 16, Jul. 30, 1992, pp. 1505-1507.*

* cited by examiner

*Primary Examiner*—John D. Lee
(74) *Attorney, Agent, or Firm*—Pearl Cohen Zedek Latzer, LLP

(57) ABSTRACT

In one version, the present invention provides an all optical device for wavelength conversion, reshaping, modulating, and regenerating, including: a splitting device having first, second, third, and fourth terminals; a nonlinear element, and an attenuator; the third and fourth terminals being associated with an optical loop including the attenuator and the nonlinear element, the nonlinear element being displaced from a center of the optical loop, wherein the splitting device is arranged to receive a modulated signal from one of the first and second terminals and a continuous beam from one of the first and second terminals and to generate based on the continuous beam a patterned signal at one of the first and second terminals, and wherein the widths of pulses of the patterned signal are proportional to the widths of pulses of the modulated signal. In an alternative version according to the present invention, the optical loop includes a nonlinear element and a coupling device for receiving chopped signals.

19 Claims, 7 Drawing Sheets

$S = T \cdot C / (2 \cdot n)$

Fig. 5a $S = T \cdot C / (2 \cdot n)$

ALL OPTICAL PHASE INSENSITIVE WAVELENGTH CONVERTERS, APPARATUS SYSTEMS AND METHODS

CROSS-REFERENCE TO RELATED APPLICATIONS

The present invention claims the benefit of U.S. Provisional Patent Application Ser. No. 60/472,137 (now expired), filed May 21, 2003, entitled "All Optical Phase Insensitive Wavelength Converters Apparatus Systems and Method".

In addition, this application is a Continuation-In-Part of U.S. patent applications Ser. Nos. 10/640,035, 10/640,018, 10/640,017 and 10/640,040 (issued U.S. Pat. No. 6,956,998 on Oct. 18, 2005), all filed Aug. 14, 2003, entitled "All Optical Decoding Systems For Decoding Optical Encoded Data Symbols Across Multiple Decoding Layers", "All Optical Decoding Systems For Optical Encoded Data Symbols", "All Optical Cross Routing Using Decoding Systems For Optical Encoded Data Symbols" and "Compact Optical Delay Lines", respectively, all of which claim the benefit U.S. Provisional Patent Application Ser. No. 60/405,697 (now expired), filed Aug. 22, 2002, entitled "Streaming Signal Control System for Digital Communication".

In addition this application is a Continuation-In-Part of U.S. patent application Ser. No. 10/472,244, filed Sep. 22, 2003, entitled "Optical Pulse Chopper" which claims the benefit of European PCT application Serial Number WO02079838 (PCT/US02/09969), filed Mar. 28, 2002, entitled "Optical Pulse Chopper".

In addition this application is a Continuation-In-Part of U.S. patent application Ser. No. 10/826,363, filed Apr. 19, 2004, entitled "All Optical Chopping For Shaping and Reshaping Apparatus And Method" which claims the benefit of U.S. Provisional Patent Application Ser. No. 60/464,351 (now expired), filed Apr. 22, 2003, entitled "All Optical Chopping For Shaping and Reshaping Apparatus And Method".

In addition this application is a Continuation-In-Part of U.S. patent application Ser. No. 10/827,314, filed Apr. 20, 2004, entitled "All Optical Chopping Using Logic Gates Apparatus And Method" which claims the benefit of U.S. Provisional Patent Application Ser. No. 60/465,237 (now expired), filed Apr. 25, 2003, entitled "All Optical Chopping Using Logic Gates Apparatus And Method".

In addition this application is a Continuation-In-Part of U.S. patent application Ser. No. 10/834,343, filed Apr. 29, 2004, entitled "All Optical Chromatic and Polarization Mode Dispersion Correctors" which claims the benefit of U.S. Provisional Patent Application Ser. No. 60/467,563 (now expired), filed May 5, 2003, entitled "All Optical Chromatic and Polarization Mode Dispersion Correctors".

FIELD OF THE INVENTION

The invention relates to optical communication devices and systems and, more particularly, to optical wavelength converters.

BACKGROUND OF THE INVENTION

In the field of optical communication, there is an intensive use of Dense Wavelength Division Multiplexing (DWDM) in which plurality of information channels corresponding to plurality of different wavelengths are inserted, in parallel, into the same optical fiber. In communication systems, there is a need to transmit information from one channel having a certain wavelength to another channel with another wavelength. Accordingly, in such a situation where these channels operate in different wavelengths, there is a need for wavelength converters to allow the transmission of the information from one information channel to another information channel and without the need of Optical-Electrical-Optical (O-E-O) converters.

Wavelength converters may be used also for switching purposes when the wavelength change results with a different port from which the radiation is emitted by wavelength sensitive demultiplexers (WDM or DWDM).

FIG. 1 is a schematic illustration of a prior art Mach Zhender Interferometer (MZI) wavelength converter 400. Wavelength converter 400 is designed to convert information generating pulses 402 of wavelength $\lambda_1$, at terminal 404, into converted information pulses 406 of wavelength $\lambda_2$, at terminal 408. Continuous Wave (CW) radiation 410 having wavelength of $\lambda_2$, is inserted at terminal 412 and is split by coupler 414 into CW radiation propagating in branches of radiation guides 416 and 418. The radiation in branched 416 and 418 passes through Solid-state Optical Amplifiers (SOA) 422 and 420, respectively, serving as Non Linear Elements (NLE). SOA's 420 and 422 are adjusted to produce relative phase shifts between the CW radiation in guides 416 and 418 for causing the radiation from guides 416 and 418 to be combined destructively in coupler 424. Accordingly, when no signal 402 is present in terminal 404, there is no output signal 406 at port 408.

When signal 402 having wavelength $\lambda_1$, is received by terminal 404 it is coupled, by coupler 426, into guide 418 and passes through SOA 420. For the time duration in which signal 404 passes through SOA 420, it causes a phase change of $\pi$ radians to the CW radiation propagating, in the opposite direction in SOA 420. In this case the CW radiation from guides 416 and 418 is combined constructively, by coupler 424, to produce pulse 406 at output 408 having wavelength $\lambda_2$ and time duration that is equal to the time duration of pulse 402. Accordingly, converter 400 converts pulses 402 of wavelength $\lambda_1$, at port 404, into similar pulses 406, of wavelength $\lambda_2$, at port 408.

Wavelength converter 400 may have the following disadvantages:

1. The device is phase sensitive and thus electric current injected to SOA's 420 and 422 should be controlled, separately, to each of them to maintain the desired phase relations and to compensate for phase changes resulted from environments changes and/or various drifts in the values of some parameters of device 400, such as gain drifts of SOA's 420 and 422.

2. In the absence of signals 402 at port 404 and in order to produce zero output signals 406 at port 408, there is a need to maintain independent gain and phase relations between amplifiers 422 and 420 at branches 416 and 418, respectively. However the gain and the phase shifts of amplifiers 422 and 420 are dependent parameters, resulting with a situation that may be difficult to control.

3. The design of the device requires two SOA's may reduce manufacturing yield, and may increase manufacturing cost and complexity.

SUMMARY OF THE INVENTION

It is an object of some exemplary embodiments of the present invention to provide phase insensitive wavelength converters.

Another object of some exemplary embodiments of the present invention is to provide wavelength converters that require only one Non Linear Element.

Yet another object of some exemplary embodiments of the present invention is to provide optical re-shapers and regenerators in which a CW beam and a generating signal have the same wavelength.

Still another object of some exemplary embodiments of the present invention is to provide optical modulators to convert direct modulated signals into low chirp signals.

In one exemplary version, the present invention provides an all optical device for wavelength conversion, reshaping, modulating and regenerating, including:

a splitting device having first, second, third, and fourth terminals;

a nonlinear element; and an attenuator, wherein the third and fourth terminals are associated with an optical loop including the attenuator and the nonlinear element, wherein the nonlinear element is displaced from a mid-point of the optical loop, wherein the splitting device is arranged to receive a modulated signal from one of the first and second terminals and a continuous beam from one of the first and second terminals, and to generate a patterned signal based on the continuous beam at one of the first and second terminals, and wherein the widths of pulses of the patterned signal are substantially proportional to the widths of pulses of the modulated signal.

In an alternative version, exemplary embodiments of the present invention provide an all-optical device for wavelength conversion, reshaping, modulating and regenerating, comprising:

a splitting device having first second third and fourth terminals;

a nonlinear element;

an optical chopper; and a coupling device, wherein the third and fourth terminals are associated with an optical loop including the coupling device and the nonlinear element, wherein the nonlinear element is displaced from amid-point of the optical loop, wherein the optical chopper is arranged to receive a modulated signal and to produce therefrom a chopped modulated signal, wherein the splitting device is arranged to receive a continuous beam from one of the first and second terminals, wherein the coupling device is arranged to couple the chopped modulated signal from the optical chopper into the optical loop and to generate a patterned signal based on the continuous beam at one of the first and second terminals, and wherein the widths of pulses of the patterned signal are substantially proportional to the widths of pulses of the modulated signal.

It should be clear that while the embodiments according to the present invention are described as wavelength converters operating by copying the pulse-pattern signal from one modulated wavelength $\lambda_1$ into another Continuous Beam (CW) having another wavelength $\lambda_2$, the embodiments may operate in a similar manner when the modulated signal and the CW beam having the same wavelength $\lambda_1=\lambda_2$. When $\lambda_1=\lambda_2$ the embodiments operate as optical shapers and 2R regenerators by copying the modulated signal onto a CW beam having the same wavelength at the modulated signal for reshaping and regenerating a new signal with a better quality. Accordingly, it should be understood that all the embodiments according to the present inventions are devices that operate under various conditions when either $\lambda_1=\lambda_2$ or $\lambda_1\neq\lambda_2$ and in any place that symbols $\lambda_1$ and $\lambda_2$ are used they may represent different wavelengths or the same wavelength.

For both of the situations when $\lambda_1=\lambda_2$ or $\lambda_1\neq\lambda_2$, the embodiments according to the present invention may operate as modulators as well. The modulated pattern signal may be produced by direct modulation. Direct modulated signals are easy to produce, but they usually suffer from a significant amount of chirp. Copying the direct modulated signals, by the embodiments according to the present invention, onto the CW beam results with modulated signal with reduced or no chirp.

BRIEF DESCRIPTION OF THE DRAWINGS

The present invention will be understood and appreciated more fully from the following detailed description of embodiments of the invention, taken in conjunction with the accompanying drawings in which:

FIG. 2b is a schematic illustration of an exemplary attenuator design that may be used in conjunction with the threshold device of FIG. 2a;

FIGS. 5a and 5b illustrate the propagation and the phases of the optical components of the generating signal and the CW radiation, in a part of the optical loop of the wavelength converter illustrated by FIG. 4, for the situation in which the width of the generating signal is wider than the recovery time of the NLE;

DETAILED DESCRIPTION OF EMBODIMENTS OF THE INVENTION

I. Optical Threshold Device

Figure 1:
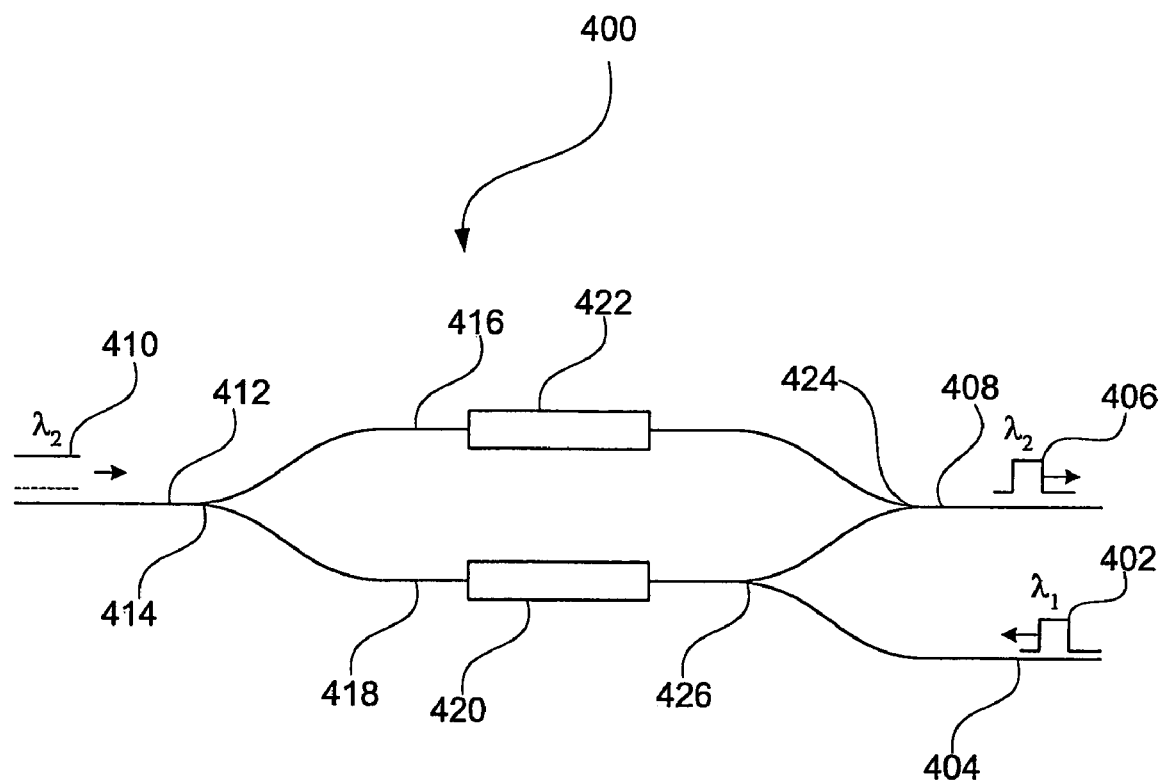
FIG. 1 is a schematic illustration of a wavelength converter known in the art that is phase sensitive and includes two Non Linear Elements (NLE's)
Figure 2A:
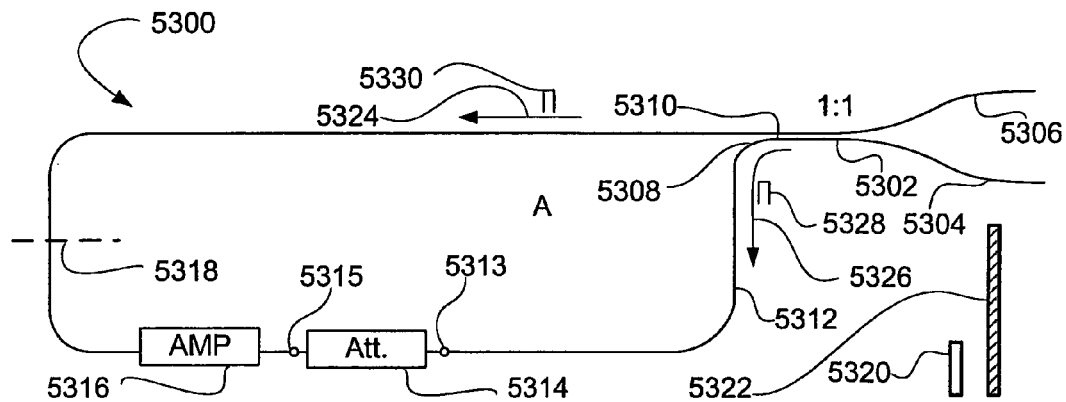
FIG. 2a is a schematic illustration of a threshold device according to exemplary embodiments of another aspect of the present invention, including a nonlinear optical loop structure.
Figure 2B:
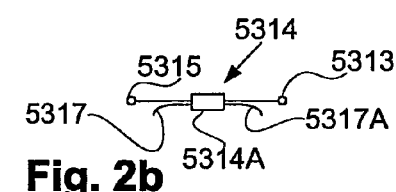

Reference is made to FIG. 2a, which schematically illustrates an optical threshold device, denoted 5300, in accordance with exemplary embodiments of another aspect of the present invention. Reference is also made to FIG. 2b, which schematically illustrates an attenuator 5314 that may be used, in conjunction with exemplary embodiments of the device of FIG. 2a. The design of device 5300 may be beneficial because it is generally insensitive to the phase of the light signals and thus does not require a phase shifter or phase control. Device 5300 includes a symmetric directional coupler 5302 having an input terminal 5304 and an output terminal 5306. Additional two terminals 5308 and 5310 of coupler 5302 may be connected to each other via a loop 5312 in a configuration similar to a loop mirror, as described below. Loop 5312 may include an amplifier 5316 and attenuator 5314. Amplifier 5316 may include any suitable type of amplifier, for example, a SOA, LOA, or EDFA. Attenuator 5314, which may be connected between connection points 5313 and 5315 on loop 5312, may include any suitable type of attenuator, for example, a Variable Optical Attenuator (VOA). It should be appreciated that the attenuators and/or VOA's used in conjunction with embodiments of the present invention may be implemented in the form of any type of device that causes attenuation of signals, including devices not conventionally used for attenuation purposes. For example, in some embodiments, an attenuation function may be implemented by an optical amplifier, e.g., a SOA, a LOA, or an EDFA, excited to levels at which the amplifier absorbs rather than amplifies input signals. In some exemplary embodiments, attenuator 5314 may include a fixed or variable coupler 5314A, connected between connection points 5313 and 5315, as illustrated schematically in FIG. 2b. The attenuation factor of attenuator 5314 may be adjustable and may depend on the fraction of energy that coupler 5314A may transmit between points 5313 and 5315 as well as the fraction of energy that coupler 5314 may couple out via a set of terminals, denoted 5317 and 5317A. When an input pulse, such as pulse 5320, is received at input 5304 of device 5300, the input pulse may be split by symmetric coupler 5302, e.g., at a splitting ratio of 1:1, into ports 5308 and 5310, respectively. A split pulse 5330 transmitted by port 5310 may propagate counterclockwise (i.e., in the direction of arrow 5324) and its phase may be shifted, by coupler 5302, π/2 radians (i.e., crossbar transmission or crossover transmission). The split pulse 5328 transmitted by port 5308 may propagate clockwise (i.e., in the direction of arrow 5326) and its phase may be not be shifted by coupler 5302 (i.e., bar transmission).

It should be noted that if loop 5312 does not include a NLE component, such as amplifier 5316, the pulses 5330 and 5328 that propagate counterclockwise and clockwise, respectively, complete their travel around loop 5312 and return to ports 5308 and 5310, respectively, with equal amplitudes and the same relative phases. The relative phase is maintained because both pulses 5328 and 5330, which propagate in mutually opposite directions, travel exactly the same distance, i.e., the length of loop 5312. The amplitudes of pulses 5328 and 5330 returning to ports 5310 and 5308, respectively, are equal to each other because they travel through the exact same medium, which is symmetric and linear for both propagation directions. This means that pulse 5330 that returns to port 5308 is π/2 radian ahead with respect to pulse 5328 that returns to port 5310. On their return paths, each of pulses 5328 and 5330, upon arrival at ports 5310 and 5308, respectively, may be re-split into ports 5306 and 5304, e.g., at a 1:1 ratio for each split, wherein the crossover split produces a phase shift of π/2 radians and the bar split does not produce any phase shift. Accordingly, the crossbar split of pulse 5330 from port 5308 may destructively interfere with the bar split of pulse 5328 from port 5310, thereby to produce substantially zero output at output port 5306. At the same time, the crossbar split of pulse 5328 from port 5310 may constructively interfere with the bar split of pulse 5330 from port 5308, thereby to produce a reflected signal that carries substantially the entire energy of pulse 5320 reflected back to input port 5304. Normalizing the input energy of pulse 5320 to a value of 1, the energy at output port 5306, when loop 5312 does not includes NLE 5316, may be given by:

$$I_{5306} = A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \qquad (6)$$

Where j indicates a phase shift of π/2 radians, and A is the intensity attenuation factor of attenuator 5314.

The energy reflected back to input port 5304 may be given by:

$$I_{5304} = A \cdot \left[ \frac{1}{\sqrt{2}} \cdot \frac{j}{\sqrt{2}} + \frac{j}{\sqrt{2}} \cdot \frac{1}{\sqrt{2}} \right]^2 = A \qquad (7)$$

Figure 3:
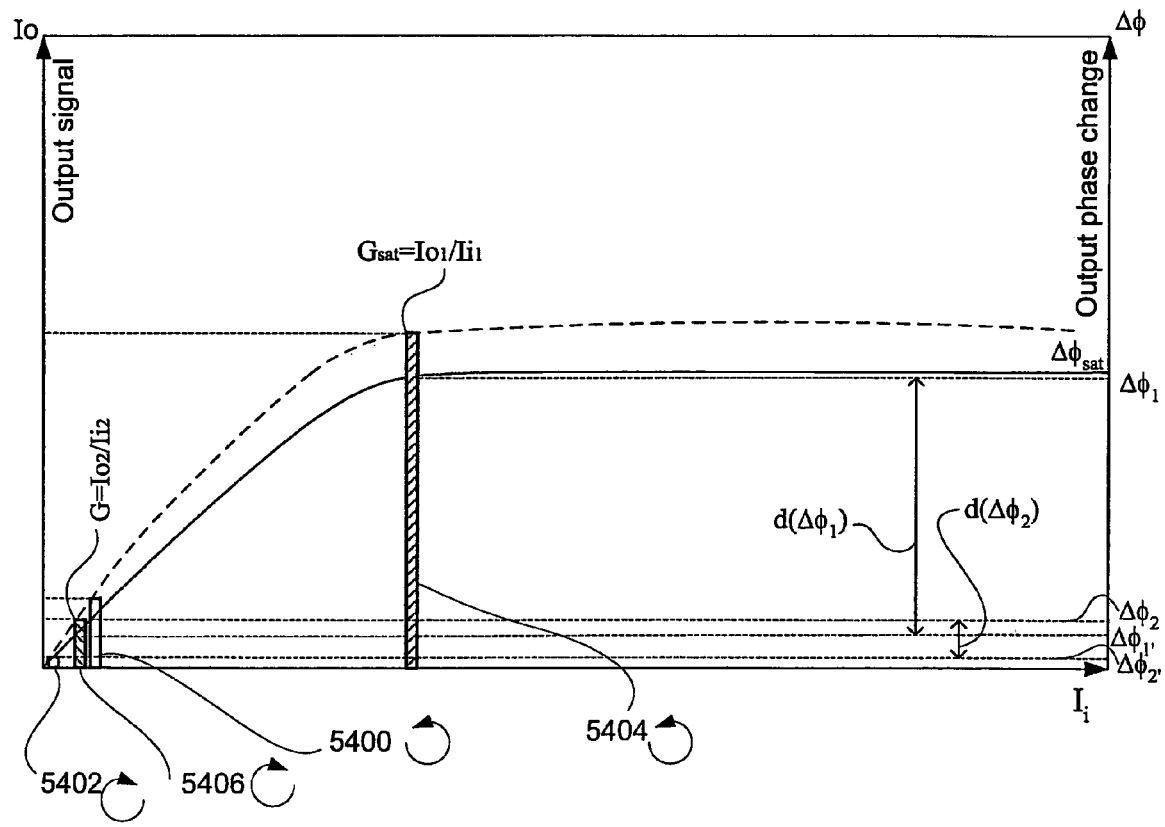
FIG. 3 is a schematic illustration of a graph depicting relative phase shift and intensity of output signals produced by a NLE according to exemplary embodiments of the invention in response to input signals of two different amplitudes, showing two pulses propagating in opposite directions for each amplitude.

FIG. 3 schematically illustrates a graph showing the relative phase shift and intensity of the output signals of a NLE, for example, amplifier 5316 of FIG. 2a, versus the input signals for two different amplitudes of pulses that propagate in opposite directions. FIG. 3 is useful in analyzing the operation of device 5300 in FIG. 2a where loop 5312 includes amplifier 5316. The graph of FIG. 3 shows the transmission function of the output intensity Io and the output phase shift Δϕ of NLE amplifier 5316 versus the input intensity Ii. When lower level input pulse 5320 having a normalized field amplitude value of 1 is received by input 5304 of device 5300 in FIG. 2a, the field amplitude of split pulse 5330, denoted 5400 in FIG. 3, propagating in the counterclockwise direction indicated by arrow 5324 in FIG. 2a, is $1/\sqrt{2}$ at the entrance of amplifier 5316. Further, in this scenario, the field amplitude of split pulse 5328, denoted 5402 in FIG. 3, propagating in the clockwise direction indicated by arrow 5326 in FIG. 2a, is $\sqrt{A}/\sqrt{2}$ at the entrance to amplifier 5316. Factor A represents the level of power intensity attenuation resulting from attenuator 5314. Since both pulses, i.e., pulses 5400 and 5402, may be within the linear range of amplifier 5316, the two pulses may be amplified by amplifier 5316 by the same intensity gain factor $G_{linear}$. The two pulses are also attenuated by the same factor A at attenuator 5314. Accordingly, both pulses return to ports 5308 and 5310 after undergoing substantially the same attenuation, A, and the same amplification, $G_{linear}$. Thus, the amplitudes of the two pulses, after amplification and attenuation, may be substantially equal to each other.

As described above, pulses 5400 and 5402 enter amplifier 5316 of FIG. 2a with different field amplitudes, e.g., $1/\sqrt{2}$ and $\sqrt{A}A/\sqrt{2}$, respectively. Accordingly, amplifier 5316 may shift the phases of pulses 5400 and 5402 by different amounts. However, since pulses 5400 and 5402 are low amplitude pulses, their phases may be shifted only by small shifts, $\Delta\phi_2$ and $\Delta\phi_{2'}$, respectively, yielding an even smaller additional relative phase shift, $d(\Delta\phi_2)=\Delta\phi-\Delta\phi_{2'}$ between the pulses. The influence of such additional relative phase shift is generally insignificant for the purposes of the invention. Accordingly, the additional relative phase shift produced by amplifier 5316 between pulses 5400 and 5402 is negligible and pulses 5400 and 5402 may return to ports 5308 and 5310 with amplitudes that are substantially equal to each other and with a relative phase shift substantially equal to their original relative phase shift, i.e., similar to the relative phase shift originally produced by coupler 5302, e.g., a phase shift of about $\pi/2$ radians.

Because the amplitudes of the pulses returning to ports 5308 and 5310 are substantially equal to each other, and due to the small influence of amplifier 5316 on the relative phases of pulses 5400 and 5402 for low level input signals, the behavior of device 5300 in this case may be generally similar to that of an analogous device (not shown) without amplifier 5316 in loop 5312. Accordingly, in the case of low level input signals, substantially all the energy of pulse 5320, after amplification by gain $G_{linear}$ and attenuation A, may be reflected back to input 5304. Based on the above, the intensity $I_{5306}$ at output port 5306 and the intensity $I_{5304}$ reflected back to port 5304 may be given by the following equations:

$$I_{5306} = G_{linear} \cdot A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \quad (8)$$

$$I_{5304} = G_{linear} \cdot A \cdot \left[ \frac{1}{\sqrt{2}} \cdot \frac{j}{\sqrt{2}} + \frac{j}{\sqrt{2}} \cdot \frac{1}{\sqrt{2}} \right]^2 = G_{linear} \cdot A$$

where $G_{linear}$ represents the intensity amplification gain within the linear range.

The desired situation in which substantially all the energy of the low level input pulse may be reflected back into the input and there is substantially no signal at the output may be achieved by using symmetric couplers, such as coupler 5302. In contrast, some prior art devices are based on using an asymmetric coupler in the entrance to a loop mirror, wherein the asymmetric coupler is an essential element of the device. It should be appreciated that the above described feature of the present invention, whereby substantially all the energy of the low level input pulse is reflected back to the input, leaving substantially no signal at the output, cannot be achieved in devices based on using asymmetric coupler at the entrance to the loop mirror, such as that used in some prior art devices.

For higher-level input pulses, for example, pulse 5322 in FIG. 2a, having field amplitude H, the counterclockwise split pulse 5404 may enter amplifier 5316 with a field amplitude $H/\sqrt{2}$, which falls within the saturation range of amplifier 5316. The clockwise split pulse 5406 may enter amplifier 5316 with a field amplitude $\sqrt{A} \cdot H/\sqrt{2}$, which falls within the linear range of amplifier 5316. Counterclockwise split pulse 5404 is amplified by amplifier 5316 by intensity gain factor $G_{sat}$, which is smaller than $G_{linear}$ due to the reduced gain in the saturation region, and the phase of pulse 5404 is shifted by the same amplifier 5316 by $\Delta\phi_1 = \Delta\phi_{sat}$.

Clockwise split pulse 5406 is amplified by amplifier 5316 by gain factor $G_{linear}$, in the linear region, and the phase of pulse 5406 is shifted by the same amplifier 5316 by $\Delta\phi_{1'}$. Although the ratio between low amplitude pulses 5400 and 5402 may be similar to the ratio between higher amplitude pulses 5404 and 5406, namely, a ratio equal to one divided by the field amplitude attenuation factor $\sqrt{A}$, the difference between the amplitudes of pulses 5404 and 5406 may be much larger than the difference between the amplitudes of pulses 5400 and 5402. Accordingly, the relative phase shift between high level pulses 5404 and 5406, denoted $d(\Delta\phi_{1sat} - \Delta\phi_{1'})$ may be much larger than the relative phase shift between low level pulses 5400 and 5402, denoted $d(\Delta\phi_2)$. This means that pulses 5404 and 5406 return to ports 5308 and 5310 with different field amplitudes $\sqrt{G_{sat}} \cdot \sqrt{A} \cdot H/\sqrt{2}$, $\sqrt{G_{linear}} \cdot \sqrt{A} \cdot H/\sqrt{2}$, respectively, and significant different phase shifts, $\Delta\phi_{sat}$ and $\Delta\phi_1$, respectively.

Thus, for such high level inputs, when choosing the proper length of amplifier 5316, $d(\Delta\phi_1)$ may be adjusted to be equal to $\pi$ radians while still maintaining a negligible value, $d(\Delta\phi_2)$, of the relative phase shift for low-level input amplitudes. When $d(\Delta\phi_1)$ is equal to $\pi$ radians, a relatively large fraction of the energy of the higher-level input pulse 5322 may be emitted out by device 5300 through its output 5306 and only a small fraction may be reflected back through input 5304. In this case, the output intensity $I_{5306}$ and the intensity $I_{5304}$ reflected back into input 5304 may be given by:

$$I_{5306} = H^2 \cdot A \cdot \left[ \frac{\sqrt{G_{linear}}}{\sqrt{2}} \cdot \frac{1}{\sqrt{2}} + \frac{\sqrt{G_{sat}}}{\sqrt{2}} \cdot \frac{1}{\sqrt{2}} \right]^2 \neq 0 \quad (9)$$

$$I_{5304} = H^2 \cdot A \cdot \left[ \frac{\sqrt{G_{linear}}}{\sqrt{2}} \cdot \frac{j}{\sqrt{2}} - \frac{j}{\sqrt{2}} \cdot \frac{\sqrt{G_{sat}}}{\sqrt{2}} \right]^2$$

In the above discussion, device 5300 is analyzed for the case where the reduced amplitude pulse 5406 is in the linear region of amplifier 5316 and the unreduced amplitude pulse 5404 is in the saturated region of that amplifier. It should be noted that there are at least two additional settings relevant to describing effective operation of device 5300. In a first additional setting, pulses 5406 and 5404 have the same gain $G_{linear}$; however, the phase sifts produced for the two pulses by amplifier 5316 are different. In a second additional setting, amplifier 5316 shifts the phases of pulses 5406 and 5404 by the same amount $\Delta\phi_1 = \Delta\phi_{sat}$; however, the gains produced for the two pulses by amplifier 5316 are different.

It should be appreciated that the analysis of device 5300 for the two additional settings of device 5300, in the case of low level input signals, may be generally the same as discussed above with reference to the case where no output signal is produced. Therefore, the two additional settings of device 5300 are not further analyzed herein in the context of low-level input signals.

Analyzing device 5300 in the range of high input signals, according to the first additional setting, it is noted that pulses 5406 and 5404 are both in the linear region of amplifier 5316. In this case, when amplifier 5316 is sufficiently long, when the length of the amplifier is appropriately adjusted and when attenuation factor A is adjusted to produce the proper ratio between pulses 5404 and 5406, the relative phase shift $d(\Delta\phi_1)$ may be adjusted to be equal to $\pi$ radians even when the amplitude of pulse 5404 is still in the linear range. Accordingly, pulses 5404 and 5406 are amplified by the same factor $G_{linear}$. Therefore, $G_{sat}$ may be replaced by $G_{linear}$ in the above equations 9, taking into account phase inversion. In this first additional setting, for high-level input signals, the entire energy may be emitted from output port 5306 and substantially no energy may be reflected back through input 5304.

According to the second additional setting, analyzed for the case of high level input signals, the amplitude of pulse 5406 may be sufficiently high to be included in the saturated range of amplifier 5316 and, thus, amplifier 5316 may not produce any relative phase shift $d(\Delta\phi_1)$ between pulse 5406 and pulse 5404, because both pulses are in the saturated region of amplifier 5316. However, since pulse 5404 may be at a much deeper saturation level than pulse 5406, pulse 5404 may have a gain, $G_{sat1}$, that is much lower than the gain, $G_{sat2}$, of pulse 5406. In this case, the transmitted intensity $I_{5306}$ and the reflected intensity $I_{5304}$ may be given by:

$$I_{5306} = H^2 \cdot A \cdot \left[ \frac{\sqrt{G_{lsat2}}}{\sqrt{2}} \cdot \frac{1}{\sqrt{2}} - \frac{\sqrt{G_{sat1}}}{\sqrt{2}} \cdot \frac{1}{\sqrt{2}} \right]^2 \neq 0 \quad (10)$$

$$I_{5304} = H^2 \cdot A \cdot \left[ \frac{\sqrt{G_{lisat2}}}{\sqrt{2}} \cdot \frac{j}{\sqrt{2}} + \frac{j}{\sqrt{2}} \cdot \frac{\sqrt{G_{sat1}}}{\sqrt{2}} \right]^2$$

Accordingly, device 5300 may operate as a threshold device that produces substantially no output signal for lower level input signals, while emitting a large fraction of the energy of higher level input signals through its output 5306. It is clear that, for all the versions of device 5300 described above, the larger the ratio between pulses 5404 and 5406, the larger the relative phase shift $d(\Delta\phi_1)$ between the pulses and the larger the different between $G_{linear}$ and $G_{sat}$, resulting in improved operation of device 5306 for the higher level input signals. It should be appreciated that, in device 5300 according to exemplary embodiments of the present invention, there may be virtually no limitation on the ratio between pulses 5404 and 5406, and the ratio may be as desired, for example, equal to one over the attenuation factor of attenuator 5314. Further, in view of the above analysis, it should be appreciated that although the use of a large attenuation factor, i.e., a small value for A, may improve the performance of device 5300 in the range of higher level input signals, such large attenuation does not degrade the performance of device 5300 in the range of lower level input signals.

It is noted that a high ratio between pulses is also desired for some prior art devices; however, in contrast to the present invention, the allegedly high ratio achieved by some prior art devices results from the asymmetry of an input coupler. To produce the desired ratio according to these prior art devices, the level of asymmetry of the asymmetric coupler must be very significant, preventing the device from blocking lower level input signals, thereby limiting and/or compromising the performance of such a device.

It is appreciated that, in contrast to prior art devices, where performance must be compromised, at least, for either the low-level input signals or the high-level input signals, there is no such compromise in device 5300 according to the present invention.

Referring again to FIG. 2a, a virtual mid point 5318 divides loop 5312 into two halves, wherein each half has an equal length, S, representing the distance from port 5310 to mid point 5318 or from port 5308 to mid point 5318. It is noted that the counterclockwise pulse 5330 and the clockwise pulse 5328 inherently meet and overlap each other at mid point 5318. When streams of pulses that are separated from each other by time periods, T, enter loop 5312 of device 5300, and split into clockwise and counterclockwise streams, a pulse in the counterclockwise stream, such as pulse 5330, meets a pulse in the clockwise stream, such as pulse 5328, every half time period, T/2. This means that after every distance X=T/2·C/n, wherein C is the speed of light in vacuum and n is the refractive index of the optical guides, there is a meeting ("collision") point between pulses that propagate in loop 5312 in opposite directions. To avoid such collisions from occurring at the NLE, e.g., at amplifier 5316, the location of the NLE should be off center by a distance δS that may be given by:

$$l \cdot X < \delta S < m \cdot X \quad (1)$$

where X is the above given distance between two adjacent meeting (collision) points and l and m are consecutive integers. For the specific example of l=0 and m=1, Equation 11 may be reduced to: δS<X.

When a low amplitude pulse, such as pulse 5406, enters amplifier 5316 first, the pulse does not deplete an inverse population of the amplifier and, thus, a higher amplitude pulse 5404 may enter the NLE immediately following the exit of pulse 5406. In a situation when the order of the locations of amplifier 5316 and attenuator 5314 is reversed, the higher amplitude pulse may enter NLE 5316 first. In this reverse order case, the higher amplitude pulse may deplete the inverse population of amplifier 5316 and, thus, a recovery time Δτ may be needed for amplifier 5316 to build an inverse population before entry of a lower amplitude pulse. Therefore, in the latter case, or in a situation where the stream of input pulses includes only high amplitude pulses, T/2 may be longer than Δτ.

As discussed above, the efficiency of device 5300 may be improved by increasing the ratio between the higher and the lower levels included in the input signal. Further, the output signals produced by device 5300 that correspond to different levels of input pulses have a more distinctive amplitude ratio than the ratio between their respective input pulses. Accordingly, an improved threshold system in accordance with exemplary embodiments of the present invention may include a configuration of a more than one device 5300, for example, at least two devices 5300 connected in series, wherein the output signals from one device 5300 may be fed directly into the input of a subsequent device 5300. Such a configuration may be used to improve threshold capability by further accentuating the distinction between lower and higher amplitude pulses.

In accordance with embodiments of the invention, each of devices 5301 and 5303 may have a "turn on" point, which may function as a threshold level. For low-level input signals in the range, e.g., below the "turn on" threshold level, output signals are strongly attenuated by destructive interference at the output port of the devices and the transmission function between the input and the output of these devices includes a monotonic range with a shallow slope. For high-level input signals, e.g., in a range above the "turn on" threshold level, the output signal at the output port of the devices increases sharply and the transmission function between the input and the output of these devices may include a range having a steep monotonic slope.

Adjustable parameters that may be used to adjust the "turn on" threshold may include but are not limited to the gain G and the length L of amplifiers 5316, 5316a and 5316b, and the attenuations of attenuators 5314, 5314a and 5314b. The excitation levels, the gains, and the attenuations of the different amplifiers and attenuators may be different for each amplifier and/or attenuator.

Figure 4:
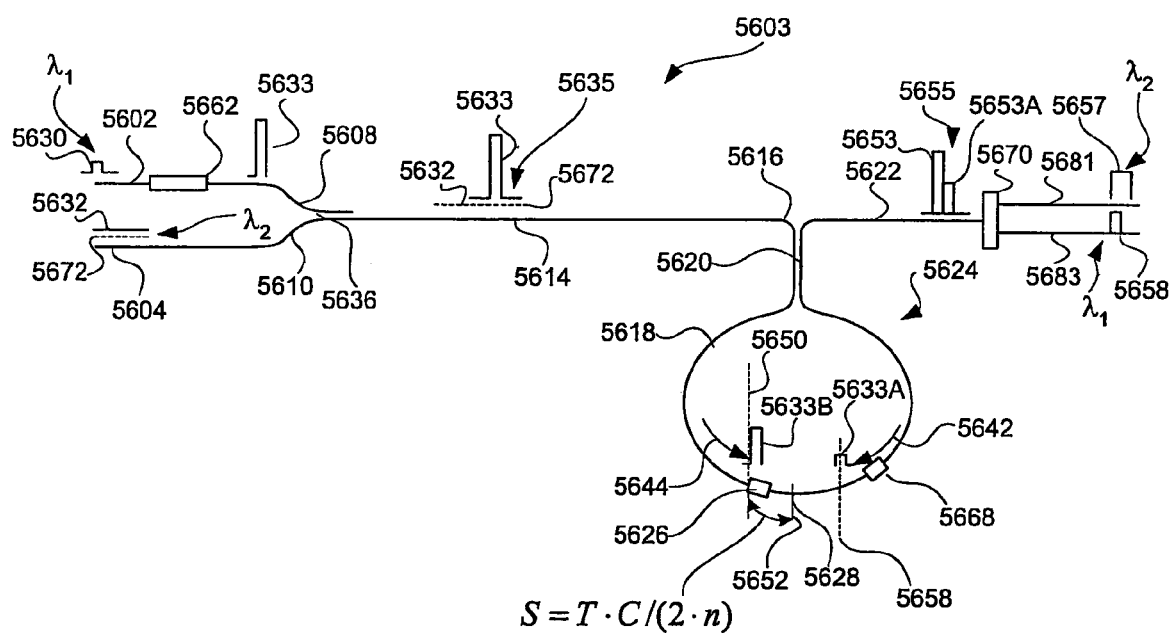
FIG. 4 is a schematic illustration of a wavelength converter configured to combine the generating signal and the CW converted radiation into the same terminal.

II. Wavelength Converter Using the Same Port for CW Radiation and Generating Pulse Pattern Referring to FIGS. 4 and 5*a*, FIG. 4 illustrates wavelength converter 5603 including summing coupler 5636 and a threshold device 5624, similar to threshold device 5300 of FIG. 2*a*, including coupler 5620, optical loop 5618, NLE 5626, and attenuator 5668. Continuous Wave (CW) radiation 5632, having wavelength $\lambda_2$ and received at input 5604 of coupler 5636, to be converted, at terminal 5622, into a pulse pattern similar to the pulse pattern of generating signal 5630, having wavelength $\lambda_1$, and received at input 5602 of coupler 5636.

The zero level of CW radiation 5632 is indicated by broken line 5672. In the absence of signal 5630 at port 5602, CW radiation 5632 is received by input 5610 of coupler 5636, to be emitted, by coupler 5636, into radiation guide 5614. CW radiation 5632 enters input 5616 of coupler 5620 of threshold device 5624. Coupler 5620 splits radiation 5632 into two components 5632A and 5632B (not shown) propagating clockwise and counterclockwise in loop 5618, respectively. Components 5632A and 5632B are illustrated by FIG. 5*a* illustrating small part of loop 5618 schematically shown as a strait line including NLE 5626.

As can be seen from FIG. 5*a*, component-5632A and 5632B are shown in the vicinity of NLE 5626, post and prior to their attenuation by attenuator 5668 of FIG. 4 (not shown), respectively. Components 5632A and 5632B are components of CW radiation and thus fill the whole length of illustrated small part of loop 5618 and thus both of them are present simultaneously at NLE 5626 while propagating along loop 5618. Accordingly, components 5632A and 5632B experience the same phase shift produced by NLE 5626. Referring back to FIG. 4, components 5632A and 5632B complete their travel, along loop 5618 and back into coupler 5620, with the same amplitudes due to the same net gain (a combination of the gain G of NLE 5626 and the attenuation A of attenuator 5668) that they experience. In this situation, components 5632A and 5632B return to coupler 5620, after completing their travel along loop 5618, with the same relative phase shift in which they enter loop 5618 and then are combined constructively with equal amplitudes to be completely reflected back into input 5616 of coupler 5620. In this situation and under optimal conditions, no energy is transmitted, from components 5632A and 5632B, into output port 5622. Accordingly, when no input generating signal 5630 having wavelength $\lambda_1$ appears at port 5602 (or when its level is zero), no output signal is produced at output port 5622.

When generating signal 5630 is present at port 5602, it may be amplified by optical amplifier 5662 to produce amplified signal 5633 at input 5608 of coupler 5636. Signal 5633 has an amplitude which is above the threshold level of threshold device 5624. Coupler 5636 combines signal 5633 from port 5608 and CW radiation 5632 from port 5610 to produce, at guide 5614 combined signal 5635 including the superposition of CW radiation 5632 and signal 5633.

Combined signal 5635 enters into terminal 5616 of coupler 5620 and is split by coupler 5620 into two optical components propagating clockwise and counterclockwise along arrows 5642 and 5644, respectively. For the clarity of the drawing, FIG. 4 illustrates only components 5633A and 5633B of signal 5633 propagating in loop 5618 in the directions of arrows 5642 and 5644, respectively. Components 5632A and 5632B of radiation 5632 are not shown in FIG. 4 and are illustrated, by FIG. 5*a*, as separate components together with components 5633A and 5633B of combined signal 5635.

NLE 5626 is located at the cross section of loop 5618 and line 5650, at a distance $S=T\cdot C/(2\cdot n)$ to the left to midpoint 5628 where T is the time width of signal 5630 (or 5633, 5633A, and 5633B), C is the speed of light in vacuum, n is the refractive index of the material from which loop 5618 is made of, and midpoint 5628 is the cross section of loop 5618 and line 5652. In such a situation where the displacement S of NLE 5626 from midpoint 5628 is equal to half of the spatial width of components 5633A and 5633B and where the length of NLE 5626 is much shorter than the width of these components, the collision (overlapping) between components 5633A and 5633B on NLE 5626 is negligible and practically can be ignored. If the components of combined signal 5635 would include only components 5633A and 5633B of FIG. 4, similar to components 5406 and 5404 of FIG. 3 (which do not collide on NLE 5626 and having amplitude above threshold), they would produce a signal only at output 5622 and no signal would be reflected back into input 5616. This situation is similar to the situation explained above, in the description for FIGS. 2*a*, 2*b*, and 3, for threshold device 5300 operating with signals that their amplitudes are above the threshold, In the event that CW radiation 5632 and signal 5633 are both included in combined signal 5635, each component 5633A and 5633B experience a phase shift, produced by NLE 5626, that is proportional to its amplitude with the additional phase shift due to components 5632A and 5632B that are present at NLE 5626 when components 5633A and 5633B pass through NLE 5626. The contribution of components 5632A and 5632B to the phase shifts of components 5633A and 5633B is similar and constant for both of them. Accordingly, as long as NLE operates within its linear region, the phase difference between components 5633A and 5633B is the same with the presence or without the presence of CW components 5632A and 5632B. Thus as long as NLE operates within its linear region, CW radiation 5632 does not affect the operation of threshold device 5624 with regard to generating signal 5630 that is completely transmitted from input 5602 to output 5622, even when CW radiation 5632 is received by input 5604.

While CW radiation 5632 has no influence on the transmission function of device 5603 for generating signal 5630 between input 5602 and output 5622, generating signal 5630 does change the properties of the transmission function of device 5603 for CW signal 5632 between input 5604 and output 5622.

FIG. 5*a* shows components 5633A and 5633B propagating clockwise and counterclockwise in the directions illustrated by arrows 5642 and 5644, respectively. Small amplitude component 5633A is illustrated after being attenuated by attenuator 5668 in loop 5616 shown in FIG. 4. Small amplitude component is small enough to produce a phase change in NLE 5626 that can be ignored. This is analog to the situation where the phase shift that small amplitude component 5406 of FIG. 3, propagating in amplifier 5316 in loop 5312 of threshold device 5300 of FIG. 2*a*, is ignored as well. Accordingly, component 5633A has no practical influence on the phase shift of components 5632A and 5632B. Thus only large amplitude component 5632B is analyzed for investigating the influence of generating signal 5630 on radiation 5632 and the influence of small amplitude component 5632A can be ignored for the purposes of this analysis.

Referring to FIG. 5a illustrating component 5633B of signal 5633 having time width T corresponding to spatial width W and is propagating together with component 5632B of CW radiation 5632 and opposite to component 5632A. When component 5633B is outside NLE 5626, there is no interaction between component 5633B and components 5632A and 5632B and thus component 5633B does not affect the phases of components 5632A and 5632B. As long as the sum of the amplitudes of components 5633B, 5632A and 5632B is within the linear region of NLE 5626, component 5633B propagating in NLE 5626 produces a phase shift of π radians to components 5632A and 5632B propagating in NLE 5626 at the same time. Component 5633B can affect the phases of CW components 5632A and 5632B only by the change that component 5633B produces in the index of refraction of NLE 5626. Thus, the other parts of CW components 5632A and 5632B, propagating in NLE 5626 when component 5633B is not present, are not affected and may have no phase change.

Figure 5B:
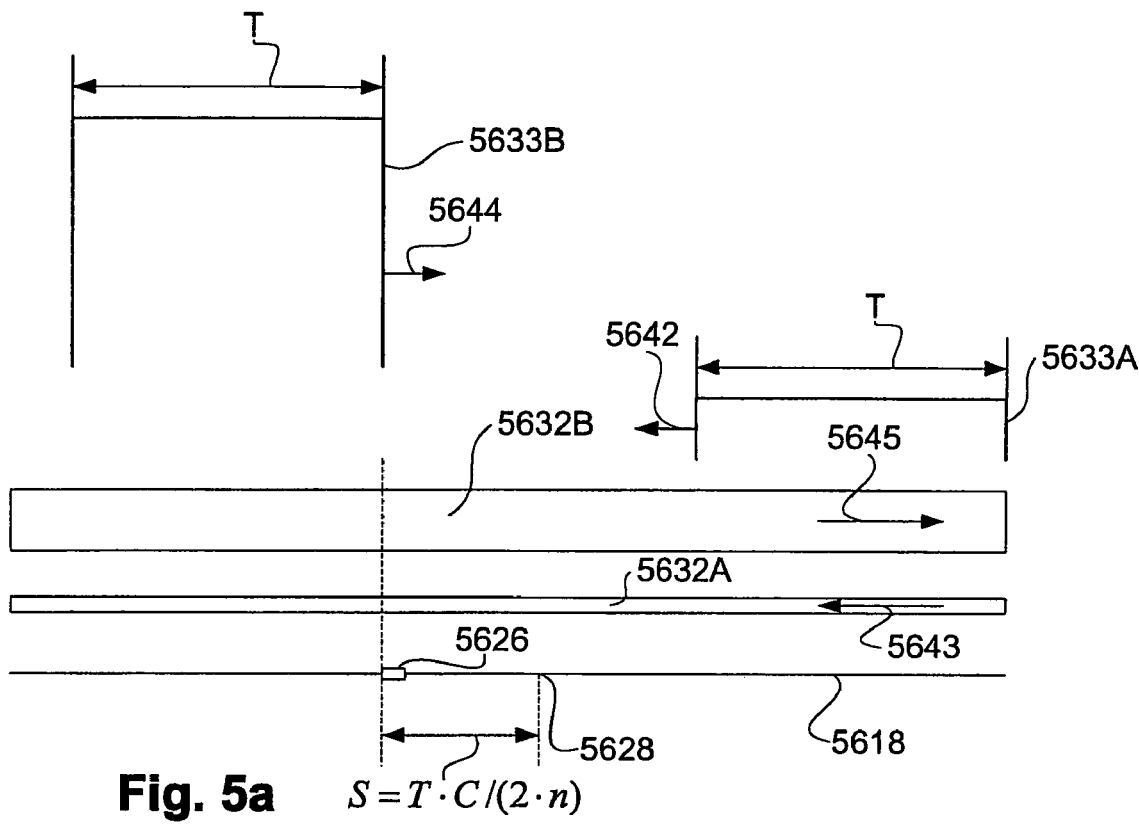
Figure 5B:
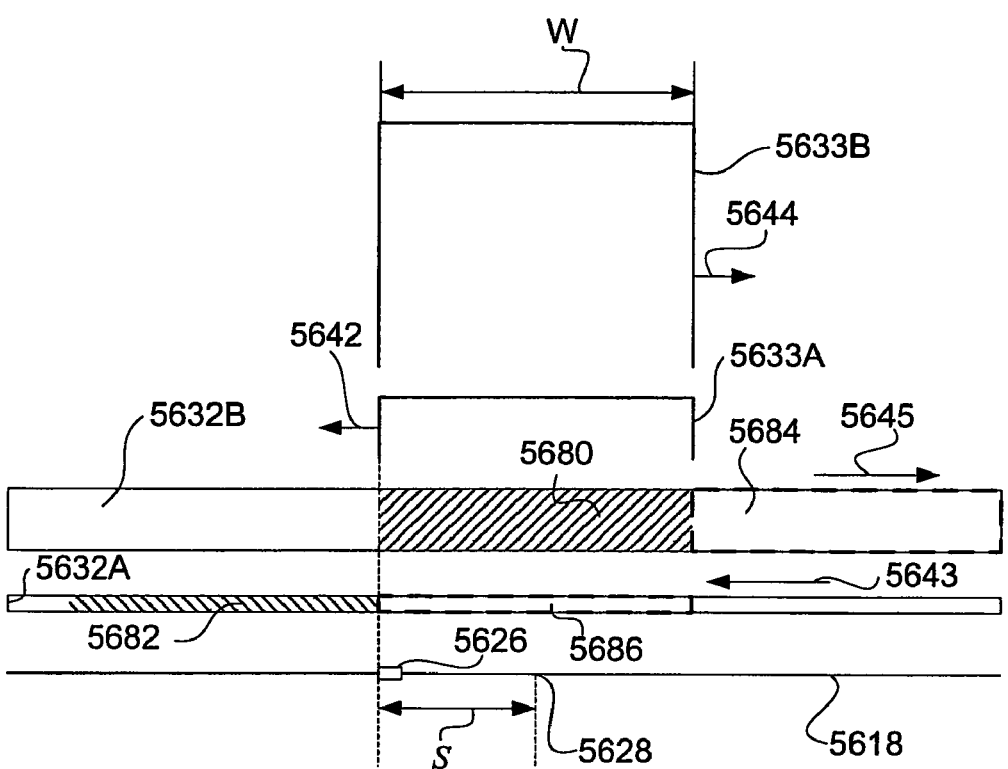

As mentioned above, the length of NLE 5626 in much smaller than the spatial width of components 5633A and 5633B and is ignored. Thus NLE is considered in our analysis as a point device with no practical length. FIG. 5b illustrates the phase changes in components 5632A and 5632B when component 5633B completes its complete travel through NLE 5626. While component 5633B passes through NLE 5626, it moves together with component 5632B and changes the phase of component 5632B by π radians. At the same time that component 5633B passes through NLE 5626, it moves along a direction that is opposite to the propagation direction of component 5632A and it changes the phase of component 5632A by π radians as well. Regions 5680 and 5682 marked by dash lines are the regions of the phase change of components 5632B and 5632A, respectively, produced by the passing of component 5633B through NLE 5626. Along regions 5680 and 5682, component 5633B overlaps components 5632B and 5632A, respectively, on NLE 5626. Regions 5680 and 5682 have a phase change that is different by π radians relative to the rest of the regions of CW components 5632A and 5632B which are not affected by component 5633B, on NLE 5626.

Accordingly, regions 5680 and 5686 of components 5632B and 5632A, respectively, which are symmetric to each other with respect to midpoint 5628, are also with a relative phase shifted by additional π radians. Similarly, Regions 5682 and 5684 have a relative phase shifted by additional π radians and are symmetric to each other with respect to midpoint 5628. Regions 5680 and 5686 that are symmetric with respect to midpoint 5628 arrive simultaneously, after fully propagating optical loop 5618 of FIG. 4, to coupler 5620 where both of these regions are already attenuated by attenuator 5668 of FIG. 4 and having amplitudes that are equal to each other. Regions 5680 and 5686 are combined, by coupler 5620 with a relative phase shifted by additional π radians, to produce signal 5653 by constructive interference at output port 5622. The interference in port 5616 is destructive and thus no signal is reflected back into port 5616. Similarly, Regions 5682 and 5684 that are symmetric with respect to midpoint 5628 arrive simultaneously to coupler 5620 where both of these regions are already attenuated by attenuator 5668 of FIG. 4 and having amplitudes that are equal to each other. Regions 5682 and 5684 are combined there with a relative phase shifted by additional π radians, to produce signal 5653A by constructive interference at output port 5622. The interference in port 5616 is destructive and thus no signal is reflected back into port 5616.

Signal 5653 at port 5622 produced by regions 5680 and 5686 of components 5632B and 5632A is formed immediately after the formation of signal 5653A formed by regions 5682 and 5684 of components 5632A and 5632B, respectively. Accordingly, signals 5653 and 5653A are adjacent and follow each other without a gap between them. Thus, for each pulse 5630 at port 5602, pulse 5655 is formed at output 5622. Pulse 5655 has double the width of pulse 5630 and is formed by wavelength $\lambda_2$ corresponding to the wavelength $\lambda_2$ of components 5632A and 5632B. As explained below, pulse 5653, which is part of joined pulse 5655, includes wavelength $\lambda_1$ as well. It should be clear that when the displacement S of amplifier 5626 from midpoint 5628 does not equal to T·C/(2·n), pulses 5653A and 5653 are separated by a time gap between them and do not join together to form a single pulse.

In general, the relation between distance S of NLE 5626 from midpoint 5628 and the space between the leading edges of pulses 5653 and 5633A at port 5622 of FIG. 4 can be derived as follows:

Pulse 5653A is formed by regions 5682 and 5684 of components 5632A and 5632B, respectively. The leading edges of regions 5682 and 5684 of components 5632A and 5632B travel a distance L−S−W along loop 5618 to be combined, by coupler 5620, into pulse 5653A at port 5622. Where L is the length from midpoint 5628 to coupler 5620 along loop 5618 (half of the length of loop 5618) and W is the width of regions 5680, 5682, 5684, 5686, pulses 5630, 5633, 5633A and 5633B. Similarly, the leading edges of regions 5680 and 5686 of components 5632B and 5632A, respectively, travel a distance L+S−W along loop 5618 to be combined, by coupler 5620, into pulse 5653 at port 5622. Accordingly, the space ΔX between the leading edges of regions 5682 and 5684 of components 5632A and 5632B and the leading edges of regions 5680 and 5686 of components 5632B and 5632A, respectively, is equal to the distance between the leading edges of pulses 5653A and 5653 at port 5622 and is given by:

$$\Delta X = (L+S-W) - (L-S-W) = 2 \cdot S$$

For the specific case, where pulses 5653A and 5653 are adjacent and are combined together with no gap between them to form a single joined pulse 5655, the space between the leading edges of pulses 5653A and 5653 should be equal to the width W of each of these pulses. The width W of these pulses is W=T·C/n. Accordingly W=ΔX=2·S or S=W/2=T·C/(2·n)

Figure 5C:
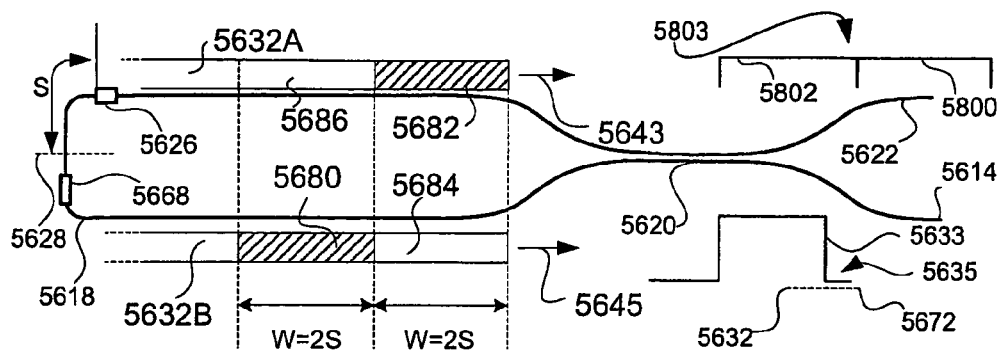
FIG. 5c schematically illustrates the recombination of the CW optical component from the optical loop at the directional coupler of FIGS. 4 and 5c.

Referring momentarily to FIG. 5c, illustrating the recombination, by coupler 5620, of the CW optical components 5632A and 5632B (both having a wavelength $\lambda_2$). The device of FIG. 5c is a part of device 5603 of FIG. 4 which is illustrated with a different aspect ratio to allow better illustration of CW optical components 5632A and 5632B. Accordingly, the same referral numerals are used for the same parts, optical pulses, and optical components illustrated in FIGS. 4, 5b, and 5c.

For the clarity of the drawing, FIG. 5c illustrates only CW optical components 5632A and 5632B returning back to coupler 5620 after experiencing phase shifts at NLE 5626 by large optical component 5633B (as illustrated in FIG. 4) of pulse 5633 (having a wavelength $\lambda_1$). FIG. 5c does not show optical components 5633A and 5633B (as illustrated in FIG. 4) of pulse 5633 (having wavelength $\lambda_1$). Arrows 5643 and 5645 indicate the clockwise and counterclockwise propagation direction of CW optical components 5632A and 5632B, respectively, as is also illustrated by FIG. 5b.

Combined signal 5635 including the superposition of CW radiation 5632 and signal 5633 is received at terminal 5614. CW components 5632A and 5632B return to coupler 5620 with equal amplitudes as each of them experiences the same amplification and attenuation while propagating the same loop. In this case and when CW optical components 5632A and 5632B have the same phase they recombine constructively at terminal 5614 and no signal appears, as they recombine destructively, at terminal 5622. However, when CW optical components 5632A and 5632B have opposite ($\pi$ radian difference) phases they recombine constructively at terminal 5622 and no signal appears, as they recombine destructively, at terminal 5614.

Hatched regions 5682 and 5680 of respective CW optical components 5632A and 5632B having a phase that is opposite to the phase of clear regions 5686 and 5684 of CW optical components 5632A and 5632B, respectively. Accordingly, hatched region 5682 and clear region 5684 are recombined, by coupler 5620, to produce pulse 5800 at port 5622. Similarly, hatched region 5680 and clear region 5686 that immediately follow regions 5684 and 5682 are recombined, by coupler 5620, to produce pulse 5802 that immediately follows pulse 5800 at port 5622. Each of pulses 5800 and 5802 have a spatial width that is equal to 2S where S is the displacement distance of NLE 5626 from center 5628 of loop 5618. Center 5628 of loop 5618 is the mid-point of the optical length of loop 5618. It will be appreciated that center 5628, i.e., the mid-point of loop 5618, is well defined geometrically. The location of attenuator 5668 may be chosen arbitrarily. The rest of CW optical components 5632A and 5632B have the same phase (clear region) and thus are reflected back into port 5614 and do not produce any signal at port 5622.

It can be seen that signals 5800 and 5802 are joined together to form a single pulse 5803 having a wavelength $\lambda_2$ produced at port 5622 in response to optical signal 5633, at port 5614, having a wavelength $\lambda_1$. The width of pulse 5803 is the sum of the width of signals 5800 and 5802 that is double the width of signal 5633.

Pulses 5800 and 5802 of FIG. 5c are similar to pulses 5653A and 5653 of FIG. 4 with the exception that pulse 5802 shows only the energy component of wavelength $\lambda_2$ included in pulse 5653 that includes the energy of both, wavelength $\lambda_1$ and $\lambda_2$. For that reason, pulse 5802 has the same amplitude as pulse 5800 while the amplitude of pulse 5653 is larger than the amplitude of pulse 5653A that includes only the energy of wavelength $\lambda_2$.

Now referring back to FIG. 5b, it can be seen that pulse 5630 having wavelength $\lambda_1$ at input 5602 of FIG. 4 is converted into pulse 5655 having wavelength $\lambda_2$ and double the width of pulse 5630. At the same time that pulse 5653 in pulse 5655 is formed at output 5622 with wavelength $\lambda_2$, pulse 5630 is transmitted from input 5602 to output 5622. Accordingly, pulse 5653 includes two pulses, one is the converted pulse having wavelength $\lambda_2$ and the other is the transmitted pulse 5630 from input port 5602 having wavelength $\lambda_1$. Since pulse 5653 is formed by two pulses its amplitude is larger than the amplitude of pulse 5653A including only the converted wavelength $\lambda_2$. Wavelength filter 5670 is used, at output 5622, in order to separate pulse 5630 having wavelength $\lambda_1$ from pulse 5653 including wavelength 22. Filter 5670 may block wavelength $\lambda_1$ to permit only the appearance of wavelength 22, at port 5681, in the form of pulse 5657. Alternatively, as illustrated by FIG. 4, filter 5670 may direct wavelengths $\lambda_1$ and $\lambda_2$ to different ports 5681 and 5683 to form there pulses 5657 and 5658, respectively Components 5680 and 5686, forming pulse 5653 at output 5622, return back from loop 5618 to coupler 5620 of FIG. 4 with phases that are opposite to the phases of components 5682 and 5684 returning back from loop 5618 to coupler 5620 and forming pulse 5653A at output 5622 of FIG. 4. Accordingly, the phase of pulse 5653A is opposite to the phase of pulse 5653. This is the case in the ideal situation where pulses 5653A and 5653 are rectangular with uniform phase. In a more practical situation, pulses 5653A and 5653 have Gaussian like shape as a result of the phase shift that pulse 5633B, also having Gaussian like shape, produces at NLE 5626. The amplitude along the tails of component 5633B is not fixed and not strong enough to reverse the phase of components 5632B and 5632A. Thus the phases vary together with the amplitudes along th e tails of pulses 5653A and 5653, having Gaussian like shape. Accordingly, the phases of the tails of pulses 5653A and 5653 are not opposite any more. In such a case the distance S of NLE 5628 can be reduced to produce overlapping between the tails of pulses 5653A and 5653. In this case, the overlapped tails of pulses 5653A and 5653 are combined along a range where in each point within this range each tail has different amplitude and the different between the amplitudes of the tails is about the same, resulting with a phase different between the tails that is about constant. The phase difference between the tails of overlapped pulses 5653A and 5653 along the combining region may be adjusted, by selecting the proper distance S, to be $\pi/2$ radians. For such a phase difference, the intensities of the tails of pulses 5653 and 5653A along most of the overlapping range, are summed into the value of the peak intensity of pulses 5653 and 5653A to produce a single combined pulse having a flat region. In this way pulses 5653 and 5653A may be combined to create flatted, unified pulses 5655 and 5657 at ports 5622 and 5681, respectively.

From the operation analysis of wavelength converter 5603 of FIG. 4 done with the assistance of the illustrations FIGS. 5a and 5b it is clear that:

1. In case that pulses 5630 are rectangular pulses, the pulse pattern 5630 having wavelength $\lambda_1$ is copied and transmitted to output 5681 with wavelength $\lambda_2$ and double the width of the generating pulses.
2. Pulses 5630 having wavelength $\lambda_1$ appear together, at output 5622, with pulses 5653 including wavelength $\lambda_2$
3. Without the presence of pulses 5630, CW radiation 5632 is reflected back into input 5616 as happen with a classic loop mirror.
4. With the presence of pulses 5630, CW radiation 5632 is transmitted into port 5622.
5. Pulses 5630 are transmitted into port 5622.
6. Gaussian Pulses 5630 may form flatten pulse 5655 at output 5622.

Figure 6:
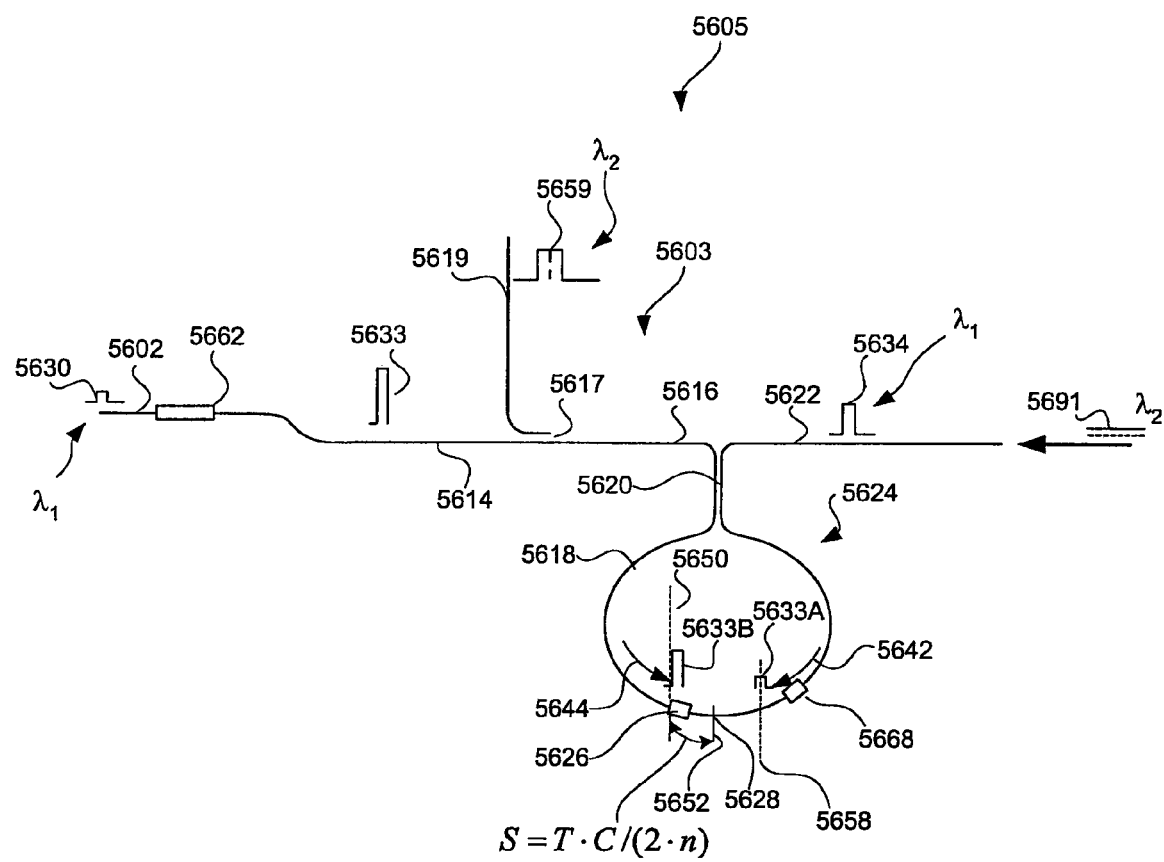
FIG. 6 is a schematic illustration of a wavelength converter configured to receive the generating signal and CW converted radiation at two different ports.

To avoid the need of separating summed pulse, such as pulses 5653 and 5630 having different wavelengths $\lambda_1$ and $\lambda_2$, respectively, at output 5622, the CW radiation 5632 may be coupled from output port 5622 as shown in FIG. 6.

Figure 5D:
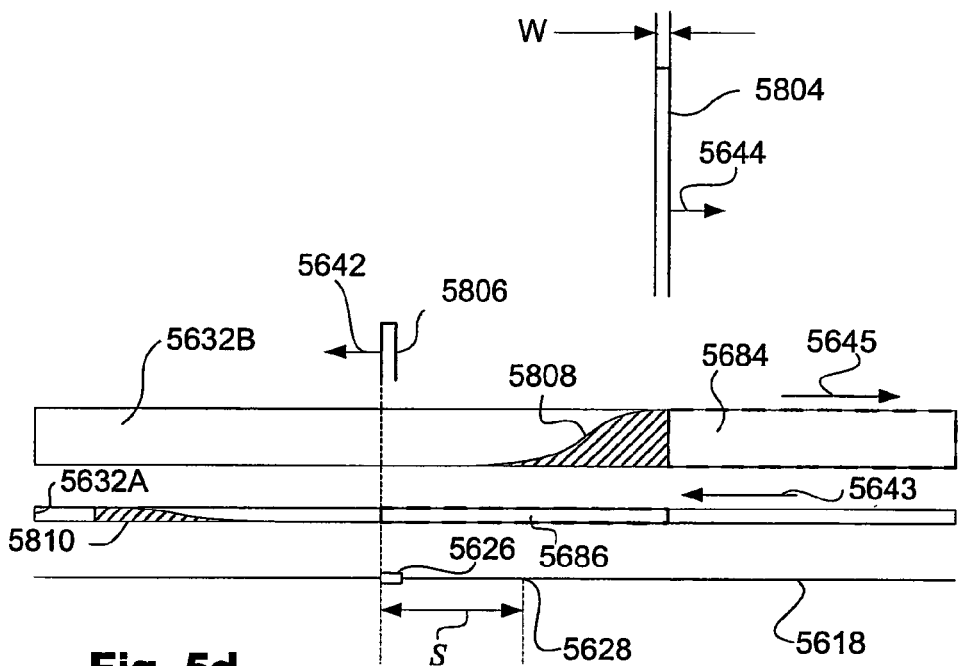
FIG. 5d schematically illustrates the propagation and the phases of the optical components of the CW radiation, in a part of the optical loop of the wavelength converter illustrated by FIG. 4, for the situation in which the width of the generating signal is narrower than the recovery time of the NLE.

FIG. 5d schematically illustrates a situation similar to the situation illustrated by FIG. 5b and thus the same referral numerals are used in FIGS. 5b and 5d for the same parts. FIG. 5d is different from FIG. 5b by the following:

1. Large and small optical components 5804 and 5806 of FIG. 5d are much narrower than large and small optical component 5633B and 5633A of FIG. 5b, respectively.
2. Hatched regions 5808 and 5810 of FIG. 5d, indicating phase change in CW optical components 5632B and 5632A, are much narrower than hatched regions 5680 and 5682 of FIG. 5b indicating the same, respectively.

The time width of optical components 5804 and 5806 is narrower than the recovery time $\tau_R$ of NLE 5626. In such a case, the phase change in regions 5808 and 5810 of respective CW optical components 5632B and 5632A produced at NLE 5626, by large component 5804, is not constant. For the time period that is equal to the width of component 5804, regions 5808 and 5810 have a phase change of about π radians relative to the clear regions of respective CW components 5632B and 5632A. For a certain time following the time width of component 5804, the phase of regions 5808 and 5810 decays, relative to the clear regions of respective CW components 5632B and 5632A, from about π radians to substantially zero. This decay has a time constant of $\tau_R$, defined by NLE 5626, resulting with hatched regions 5808 and 5810 having a decaying phase shift. Thus hatched regions 5808 and 5810 of FIG. 5*d* are much narrower than respective hatched regions 5680 and 5682 of FIG. 5*b* that have a wide region with substantially constant phase shift.

Figure 5E:
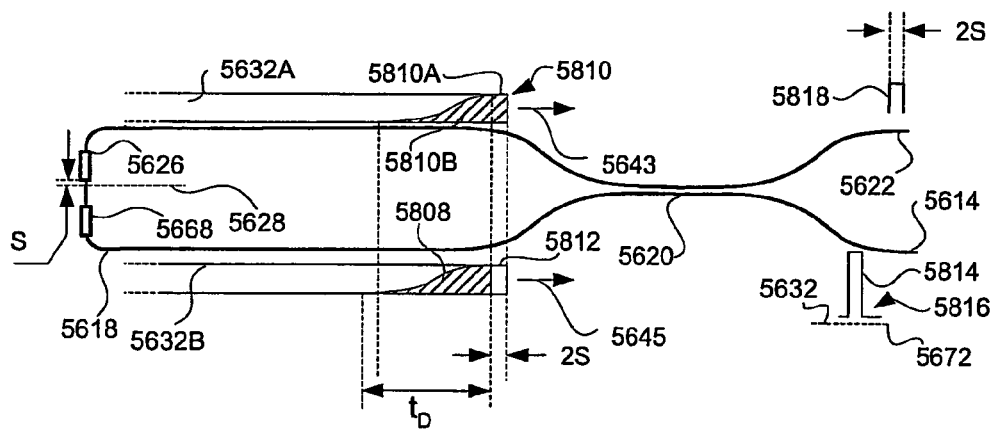
FIG. 5e is a schematic illustration of the recombination of the CW optical component from the optical loop at the directional coupler of FIGS. 4 and 5e, for the situation in which the width of the generating signal is narrower than the recovery time of the NLE.

FIG. 5*e* illustrates a device similar to the device of FIGS. 4 and 5*c*. Accordingly the same referral numerals are used for the same parts of FIGS. 4, 5*c* and 5*e*. FIG. 5*e* is different from FIG. 5*c* by the following:

1. The displacement S of amplifier 5626 from center 5628 of loop 5618 at FIG. 5*e* is much smaller than the displacement S at FIG. 5*c*.
2. Hatched regions 5810 and 5808 of FIG. 5*e* are different from hatched regions 5682 and 5684 of FIG. 5*c*.
3. Pulse 5814 having a wavelength $\lambda_1$ at port 5614 of FIG. 5*e* is much narrower than respective pulse 5633 of FIG. 5*c*.

FIG. 5*e* illustrates the recombination by coupler 5620, of the CW optical components 5632A and 5632B (having a wavelength $\lambda_2$). The device of FIG. 5*e* is part of device 5603 of FIG. 4 which is illustrated with a different aspect ratio to allow better illustration of CW optical components 5632A and 5632B.

For the clarity of the drawing, FIG. 5*e* illustrates only CW optical components 5632A and 5632B returning back to coupler 5620 after experiencing phase shifts at NLE 5626 by large optical component 5804 of pulse 5814 (having a wavelength $\lambda_1$) as described above and is shown in FIG. 5*d*. Accordingly, FIG. 5*e* does not show optical components 5804 and 5806 of pulse 5814 (having wavelength $\lambda_1$). Arrows 5643 and 5645 indicate the clockwise and counter-cloclwise propagation direction of CW optical components 5632A and 5632B, respectively, as is also illustrated by FIG. 5*d*.

Combined signal 5816, including the superposition of CW radiation 5632 and signal 5814, is received at terminal 5614. CW components 5632A and 5632B return to coupler 5620 with equal amplitudes after each of them experiences the same amplification and attenuation. In this case and when CW optical components 5632A and 5632B have the same phase they recombine constructively at terminal 5614 and no signal appears, as they recombine destructively, at terminal 5622. However, when CW optical components 5632A and 5632B have opposite (π radian difference) phases they recombine constructively at terminal 5622 and no signal appears, as they recombine destructively, at terminal 5614.

The largest phase shift of hatched regions 5810 and 5808 of respective CW optical components 5632A and 5632B is when they have a phase that is opposite the phase of the clear regions of CW optical components 5632A and 5632B. Accordingly, hatched region 5810A and clear region 5812 are recombined, by coupler 5620, to produce single pulse 5818 at port 5622. Region 5810A (of region 5810) and region 5812 have a spatial width of 2S that is equal to the delay between hatched regions 5810 and 5808, due to the displacement S of NLE 5612 from center 5628 of loop 5618. Thus pulse 5818 is constructed by the recombination of regions 5810A and 5812 and has a width of 2S as well. The location of attenuator 5628 may be chosen arbitrarily.

Though regions 5810 and 5808 are shifted in time, the phase difference between region 5810B (of region 5810) and region 5808, arriving to coupler 5620 during the time period $t_D$ in which the phase shifts of regions 5810B and 5808 decay with time, is very small. This phase difference may be considered, for practical purposes, as being negligible and substantially zero. Accordingly, the phases of regions 5810B and 5808 are substantially the same. Thus regions 5810B and 5808 do not produce any signal at port 5622 and their energy is reflected, by coupler 5620 back into port 5614. The rest of the CW optical components 5632A and 5632B have the same phase (clear region) and thus are reflected back into port 5614, as well, and do not produce any signal at port 5622.

It can be seen that regions 5810A and 5808 are joined together to form a single pulse 5818 having a wavelength $\lambda_2$ produced at port 5622 in response to optical signal 5814, at port 5614, having a wavelength $\lambda_1$. The spatial width of pulse 5818 is about double the width of displacement S of NLE 5626 from center 5628 of loop 5618.

The spatial displacement 2S between regions 5810 and 5808 corresponds to a time shift of 2Δt, where Δt=(S·n)/C, C is the speed of light in vacuum and n is the refractive index of the material from which of loop 5618 is made of.

III. Wavelength Converter Using Different Ports for Receiving CW Radiation and Generating Pulse Pattern FIG. 6 illustrates wavelength converter 5605 that is similar to wavelength converter 5603 of FIG. 4 with the following changes:

1. Port 5604 was removed from device 5603 together with coupler 5636.
2. Terminal 5602 was connected directly to guide 5614
3. Filter 5670 and ports 5681 and 5683 were removed from device
4. CW radiation signal 5632 of device 5603 is coupled as signal 5691 to port 5622 of device 5605.
5. Coupler 5617 was added into guide 5614.

Except for the changes listed above, devices 5603 and 5605 have a similar structure and thus the same referral numerals are used in FIGS. 4 and 6 for the same components and signals in devices 5603 and 5605, respectively.

As explained above for device 5603, the relation between CW radiation 5632 and pulse 5630 depends only on the situation in loop 5618 of threshold device 5624, regardless from which port these signals arrive to loop 5618. In addition, threshold device 5624 operates symmetrically for signals arriving to loop 5618 from ports 5622 and 5616.

Accordingly, when no signal 5633 is present at port 5602, CW radiation 5691, arriving to loop 5618 from terminal 5622, is reflected back into terminal 5622. Generating signal 5630 appears as signal 5633 in guide 5614. Signal 5633 is above the threshold of threshold device 5624. Generating signal 5630 arrives at guide 5614 and from there, via coupler 5617, to guide 5616 and device 5624. Generating signal 5630 is transmitted, by device 5624, to port 5622 and appears at port 5622 as signal 5634 having wavelength $\lambda_1$. When distance S is adjusted to be T·C/(2·n) and generating signal 5630 is present at port 5630, part of CW radiation 5691 is transmitted, by device 5624, from port 5622 to port 5616 to form, in guide 5616, converted pulse 5659. Converted pulse 5659 is coupled from guide 5616, by coupler 5617, to port 5619. Converted pulse 5659 having the same wavelength $\lambda_2$ of CW radiation 5691 from which it is produced. Pulse 5659 has double the width of pulse 5630.

Like pulse 5655 of FIG. 4, produced by joining two pulses, pulse 5659 is formed by combining two converted pulses. However, unlike the situation in FIG. 4, in which pulses 5653A and 5653 are joined together to form converted pulse 5655 of device 5603, resulting in pulse 5653 that contains both wavelength $\lambda_1$ and $\lambda_2$, here the two pulses of which converted pulse 5659 is formed, contains radiation with wavelength $\lambda_1$ only. Accordingly, the two pulses from which converted pulse 5659 is formed contains radiation with wavelength $\lambda_1$ and thus both of them have the same amplitudes which form flat pulse 5659.

Since no radiation with wavelength $\lambda_1$ is reflected back into port 5619, there is no need to use a wavelength filter for blocking or separating wavelength $\lambda_2$ of converted signal 5659 from wavelength $\lambda_1$ of pulse 5630.

To increase the efficiency of device 5605, a wavelength sensitive coupler 5617 may be used to perform bar transition for wavelength $\lambda_1$ and cross-bar transmission for wavelength $\lambda_2$. In this way the whole energy of pulse 5630 is coupled to loop 5618 to perform there efficient wavelength conversion and the whole energy of converted pulse 5659 is coupled out from guide 5616 into port 5619. In this configuration and in the event that device 5605 operates in non optimal conditions and may reflect radiation with wavelength $\lambda_1$ back into guide 5616 and from there to port 5619, coupler 5617 also serves as a filter which may prevent the arrival of wavelength $\lambda_2$ to port 5619.

In general, it should be understood that all the embodiments according to the present invention may be operated in any one of the four different modes listed below:

1. The modulated signal has pulses wider than the recovery time of the NLE such as illustrated, as an example, in FIGS. 4, 5*a*–5*c*, 6 and 7.
2. The modulated signal has pulses narrower than the recovery time of the NLE such as illustrated, as an example, in FIGS. 5*d* and 5*e*.
3. The modulated signal is copied onto a CW beam having a different wavelength as the modulated pulses.
4. The modulated signal is copied onto a CW beam having the same wavelength as the modulated pulses.

In all the operation modes listed above, the preferred displacement S of the NLE from the center of the loop in the embodiments according to the present invention is equal to W/2, where W is the width of the pulses needed to be copied onto a CW beam.

Figure 7:
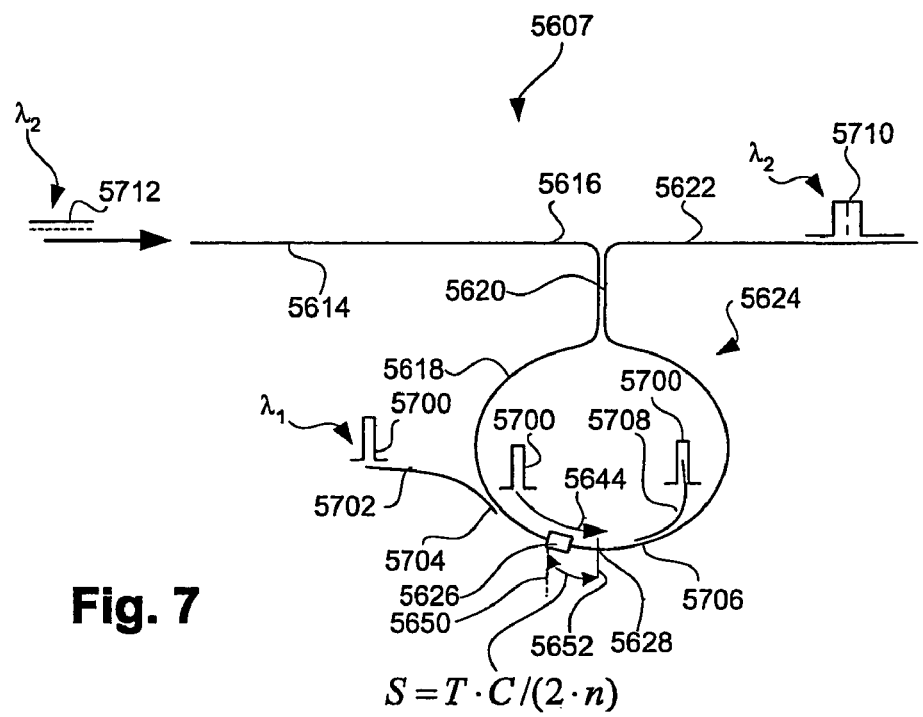
FIG. 7 is a schematic illustration of a wavelength converter configured to receive the generating signal directly into its optical loop.

IV. Wavelength Converter Using Generating Signal Inserted Directly into an Optical Loop FIG. 7 illustrates an additional version 5607 of wavelength converter according to the present invention. Wavelength converter 5607 is similar to device 5603 of FIG. 4 with the following changes:

1. Coupler 5636 and its terminals 5602 and 5604 were removed from device 5603 together with amplifier 5662.
2. CW radiation input signal 5632 is coupled directly, as signal 5712, to guide 5614 of device 5607.
3. Attenuator 5668 was removed from loop 5618 of device 5603.
4. Filter 5670 with its terminals 5681 and 5683 were removed from device 5603.
5. Couplers 5704 and 5706 with their terminals 5702 and 5708, respectively, were added to loop 5618 of device 5607.

Except for the changes listed above, devices 5603 and 5607 have a similar structure and thus the same referral numerals are used in FIGS. 4 and 7 for the same components and signals in devices 5603 and 5607, respectively.

As explained above for device 5603, the relation between CW radiation 5632 and pulse 5630 depends only on the situation in loop 5618 of threshold device 5624, regardless from which port these signals arrive to loop 5618. In both of devices 5603 of FIGS. 4 and 5607 of FIG. 7 the relation, in loop 5618, between the CW radiation and the generating signal is as illustrated by FIGS. 5*a* and 5*b* with respect to CW components 5632A and 5632B and high amplitude signal 5633B.

As illustrated by FIGS. 5*a* and 5*b* and explained in their accompanied descriptions above, only the large component 5633B of generating signal 5633 plays a major rule in the wavelength conversion process, while small amplitude 5633A does not take any practical rule in this process. Coupler 5620, in device 5603 of FIG. 4, splits generating signal 5633 into two components 5633A and 5633B having equal amplitudes. Attenuator 5668, in loop 5618 of device 5603 of FIG. 4, is used to suppress component 5633A of signal 5633 for leaving only one component 5633B having significant amplitude in the vicinity of NLE 5626. In the configuration of device 5607, generating signal 5700 is coupled from terminal 5702, by coupler 5704, directly into loop 5618 and is directed there only in one direction, resulting in only one generating signal propagating in loop 5618. Since only one generating signal propagates in loop 5618, there is no need for attenuator 5668 and it was removed from loop 5618 of device 5607.

Accordingly, in device 5607, the relations between CW radiation 5712 received by guide 5614 and generating signal 5700 coupled into loop 5618, by coupler 5704, from terminal 5702 are similar to the relations between CW radiation 5632 and generating pulse 5630 of FIG. 4. The process of the wavelength conversion in device 5607 may be illustrated by FIGS. 5*a* and 5*b* where component 5633B represents generating signal 5700 of FIG. 7 and CW components 5632A and 5632B represents the components of CW radiation 5712 in loop 5618. CW component 5633A does not exists in FIGS. 5*a* and 5*b* for the situation related to FIG. 7 but, component 5633A has no practical influence, on the wavelength conversion, in any of the cases illustrated by FIGS. 4 and 7 and thus ignored in the analysis for both of the cases illustrated by FIGS. 4 and 7.

Thus when pulse 5700 propagates via NLE 5626 of device 5607, it changes there the phases of the CW components of CW signal 5712 resulting with wavelength conversion that appears as converted signal 5710 at port 5622. Generating signal 5700 has wavelength $\lambda_1$ and converted pulse 5710 has double the width of generating signal 5700 and the same wavelength $\lambda_2$ of CW radiation from which it is converted.

Coupler 5706 may be used for filtering pulse 5700 out from loop 5618 and into terminal 5708. Pulse 5700 is filtered out, by coupler 5706, after the complete travel of pulse 5700 through NLE 5626. Thus the filtering out of pulse 5700 is performed after the process of the wavelength conversion and when pulse 5700 is not needed any more. Filtering out pulse 5700 avoids the appearance of the generating wavelength $\lambda_1$ at terminal 5622 and prevent the mixing of this wavelength with the converted signal 5710 having wavelength $\lambda_2$.

Couplers 5704 and 5706 may be wavelength sensitive and adjusted to produce bar transmission for wavelength $\lambda_2$ and cross-bar transmission for $\lambda_1$. In this way no energy of CW radiation having wavelength $\lambda_2$ is lost, by couplers 5604 and 5606, from loop 5618, resulting in efficient wavelength conversion. At this configuration, all the energy of pulse 5700 having wavelength $\lambda_1$ is coupled into loop 5618, by coupler 5702, from terminal 5702 and before NLE 5626, resulting in efficient wavelength conversion. The generating wavelength $\lambda_1$ is completely coupled out, by coupler 5706, from loop 5618 and into port 5708, resulting in no unwanted radiation of the generating signal at port 5622 having wavelength $\lambda_1$.

Figure 8:
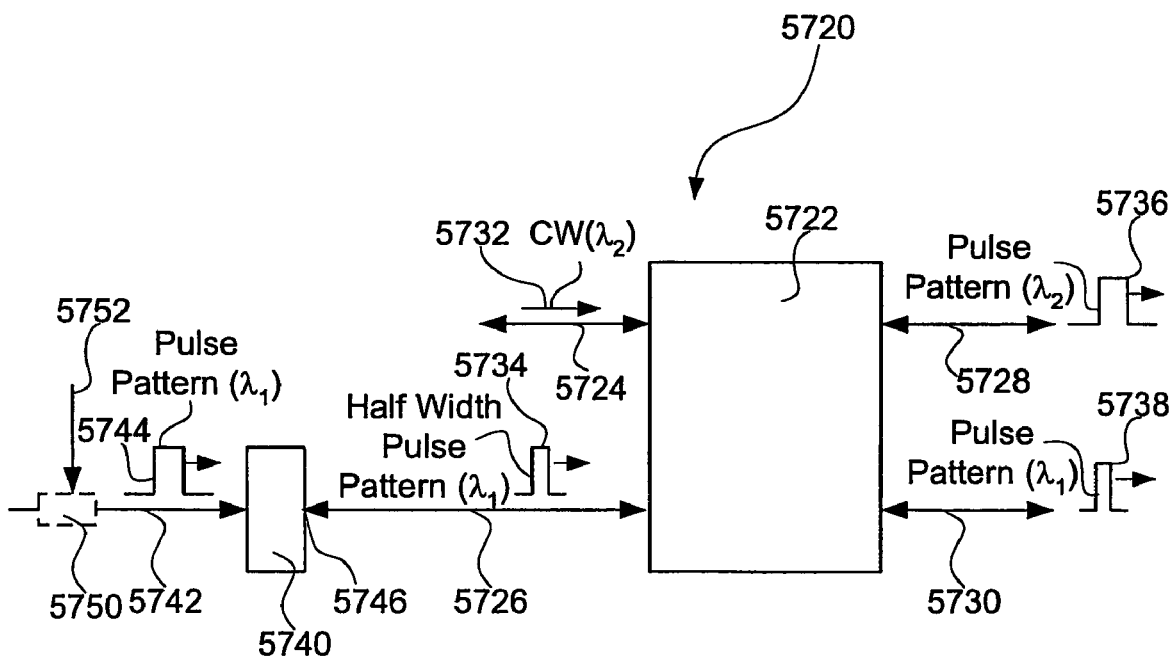
FIG. 8 is a schematic illustration of a wavelength converter designed to produce converted signals with adjustable width.

Wavelength converters 5603, 5605, and 5607 of FIGS. 4, 6, and 7, respectively, receive, at one terminal, generating pulses having a certain width and a wavelength $\lambda_1$. At the same time converters 5603, 5605, and 5607 receive, at a second terminal, CW radiation with a wavelength $\lambda_2$ and produce converted signals, at a third terminal, having wavelength $\lambda_2$ including two pulses joined together to form one pulse having a width that is double the width of the generating signal. In a situation where the converted signal should be similar, in its width, to the width of the generating signal (or to a different width), a pulse chopper may be added to the receiving terminal of devices 5603, 5605, and 5607 as illustrated by FIG. 8, for adjusting the width of the generating signal.

V. Wavelength Converter Designed to Generate Converted Signal with Adjustable Width FIG. 8 illustrates wavelength converter 5720 including wavelength converter 5722. Wavelength converter 5722 illustrated by a bock diagram represents any of devices 5603, 5605, and 5607 of FIGS. 4, 6, and 7, respectively. Terminals 5724, 5726, 5728, and 5730 are illustrated by double head arrows to indicate that these terminals may be Input/Output (I/O) terminals capable of both receiving and emitting input and output signals. I/O terminal 5724 receives CW radiation 5732 having wavelength $\lambda_2$ and is analog to terminals 5604, 5622, and 5614 of devices 5603, 5605, and 5607 of FIGS. 4, 6, and 7, respectively. I/O terminal 5726 receives generating signal 5734 having wavelength $\lambda_1$ and is analog to terminals 5602, 5602, and 5702 of devices 5603, 5605, and 5607 of FIGS. 4, 6, and 7, respectively. I/O terminal 5728 emits converted signal 5736 having wavelength $\lambda_2$ and is analog to terminals 5681, 5619, and 5622 of devices 5603, 5605, and 5607 of FIGS. 4, 6, and 7, respectively. I/O terminal 5730 emits original generating signal 5738 having wavelength $\lambda_1$ and is analog to terminals 5683, 5622, and 5708 of devices 5603, 5605, and 5607 of FIGS. 4, 6, and 7, respectively.

Generating signal 5744 having wavelength $\lambda_1$ enters through terminal 5742 into optical chopper 5740. Chopper 5740, illustrated by a block diagram, may represent any optical chopper that is capable of receiving an optical pulse at its input terminal 5740 and emitting, at its output terminal 5746, an optical pulse that is narrower than the input pulse. In particular, chopper 5740 may represent any of the choppers disclosed in Provisional Patent Application Ser. No. 60/472,137 filed May 21, 2003, entitled "All Optical Phase Insensitive Wavelength Converters Apparatus Systems and Method", (see "Reference to Other Applications" section above); U.S. patent application Ser. No. 10/472,244, filed Sep. 22, 2003, entitled "Optical Pulse Chopper" (see "Reference to Other Applications" section above); U.S. patent application Ser. No. 10/826,363, filed Apr. 19, 2004, entitled "All Optical Chopping For Shaping And Reshaping, Apparatus And Method" (see "Reference to Other Applications" section above), and U.S. patent application Ser. No. 10/827,314, filed Apr. 20, 2004, entitled "All Optical Chopping Using Logic Gates Apparatus And Method" (see "Reference to Other Applications" section above)—all which are thoroughly incorporated here by references.

Generating signal 5744 may be chopped, by chopper 5740, to produce chopped signal 5734 at output 5746 and propagating into terminal 5726. Signal 5734 may be chopped to half of the width of signal 5644. Converted signal 5736 having wavelength $\lambda_2$ and double the width of signal 5734 and thus have a width similar to the width of original generating signal 5744 having wavelength $\lambda_1$. Accordingly, it is clear that converter 5720 may convert the generating signals having wavelength $\lambda_1$ into converted signals having wavelength $\lambda_2$ while maintaining the width of generating signals 5744 and the converted signals 5736 to be with the same width.

Chopper 5740 may be adjusted to chop pulse 5744 by any desired fraction and may be used to correct for the broadening caused by Chromatic Dispersion (CD) and Polarization Mode Dispersion (PMD) in a way similar to the disclosed in US Patent Application Invented by Arie Shahar and Eldan Halberthal, filed Apr. 29, 2004, entitled "All Optical Chromatic and Polarization Mode Dispersion Correctors" (see "Reference to Other Applications" section above) is thoroughly incorporated here by reference. In case that pulse 5744 at terminal 5742 is broaden, by CD or PMD, relative to its initial width at its generation or regeneration, it may be chopped, by chopper 5740, to produce pulse 5734 that its width is half of the width of the original pulse at its generation and prior to its broadening by CD and PMD. In such a case, converted pulse 5736 may have a width similar to the width of the pulses at their generation and prior to their broadening.

All the embodiments according to the present invention may include direct modulated light source at their input, such as, laser 5750 illustrated by broken line at input 5742 of FIG. 8. Laser 5750 is modulated by modulating its injection current at its electronic terminal 5752 to produce direct modulated optical pulses 5744. Pulses 5744 may include large amount of chirp. For reducing the amount of chirp that pulses 5744 may have they are converted into modulated pulses 5736 at port 5728. Pulses 5728 are produced by copying pulses 5744 onto a CW beam and thus pulses 5736 have reduced or no chirp. Pulses 5744 and 5736 may have the same wavelength or different wavelengths. Accordingly the embodiments according to the present invention may also be modulators.

It can be seen that the wavelength converters designed according to the present invention are phase insensitive devices and include only one NLE. Device 5720 of FIG. 8 may include additional NLE in its chopper, but still the wavelength conversion unit 5722 of device 5720 includes only one NLE. Wavelength converter 5603 of FIG. 6 may produce monochromatic converted signal without the assistance of wavelength filters. Accordingly, when its coupler 5620 is wavelength insensitive coupler, the device is phase and wavelength insensitive wavelength converter.

All the embodiments according to the present invention may include optical isolators in their inputs through which the CW radiation and the pattern of the generating signals are coupled into the wavelength converters. Such optical isolators may block the back reflection and the return of CW radiation and or pulses back into the sources of the CW radiation and the generating signals.

All the embodiments according to the present invention, may include a continuous sequence of optical components connected by light guiding media such as, for example, optical fibers, planar waveguides, or planar circuits (PLC), which media may be fabricated using integrated optic techniques and/or on-chip manufacturing. Alternatively, All the embodiments according to the present may be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators may include variable and/or adjustable components. It should be clear that all amplifiers may made of amplifying media and devices and in particular are made of SOA's, LOA's and EDFA's. It should be appreciated that all attenuators are made of attenuating media and devices and in particular are made of couplers and absorbing amplifiers.

It should be clear that while the embodiments according to the present invention are described as wavelength converters operating by copying the pulse-pattern signal from one modulated wavelength $\lambda_1$ into another Continues Beam (CW) having another wavelength $\lambda_2$, the embodiments may operate in a similar manner when the modulated signal and the CW beam have the same wavelength $\lambda_1=\lambda_2$. When $\lambda_1=\lambda_2$ the embodiments operate as optical shapers and 2R regenerators by copying the modulated signal onto a CW beam having the same wavelength at the modulated signal for reshaping and regenerating a new signal with a better quality. Accordingly, it should be understood that all the embodiments according to the present inventions are devices that operate under various conditions when either $\lambda_1=\lambda_2$ or $\lambda_1 \neq \lambda_2$ and in any place that symbols $\lambda_1$ and $\lambda_2$ are used they may be different wavelengths or the same wavelength. All the embodiments according to the present invention may operate as modulators as well when receiving direct modulated pulses with chirp and converting them, by copying on a CW beam, into pulses with reduced or no chirp.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An all optical device for wavelength conversion, reshaping, modulating and regenerating, comprising:
a splitting device having first, second, third, and fourth terminals;
a nonlinear element; and
an attenuator,
wherein said third and fourth terminals are associated with an optical loop including said attenuator and said nonlinear element, wherein said nonlinear element is displaced from a mid-point of said optical loop, wherein said splitting device is arranged to receive a modulated signal from one of said first and second terminals and a continuous beam from one of said first and second terminals and to generate a patterned signal based on said continuous beam at one of said first and second terminals, and
wherein the widths of the pulses of said patterned signal are substantially proportional to the widths of the pulses of said modulated signal.

2. The device of claim 1 wherein said nonlinear element is displaced from said center of said optical loop by a distance equal to half of the spatial widths of said pulses of said modulated signal.

3. The device of claim 1 wherein said modulated signal and said continuous beam have different wavelengths.

4. The device of claim 1 wherein said modulated signal and said continuous beam have the same wavelength.

5. The device of claim 1 wherein one of said first and second terminals is arranged to receive said modulated signal and said continuous beam.

6. The device of claim 1 wherein one of said first and second terminals is arranged to receive only said modulated signal.

7. The device of claim 1 wherein one of said first and second terminals is arranged to receive only said continuous beam.

8. The device of claim 1 wherein said device further includes at one of said first and second terminals an optical amplifier.

9. The device of claim 1 wherein said device further includes at one of said first and second terminals a wavelength filter.

10. The device of claim 1 wherein said device further includes a directing device for directing said patterned signal from said one of said first and second terminals to a fifth terminal.

11. The device of claim 1 wherein said device further includes at one of said first and second terminals a light source modulated directly.

12. The device of claim 1 wherein said device further includes at one of said first and second terminals an optical chopper.

13. The device of claim 12 wherein said optical chopper is adjusted to chop half of said widths of said pulses of said modulated signal.

14. The device of claim 1 wherein said widths of said pulses of said modulated signal are narrower than the recovery time of said non linear element.

15. The device of claim 1 wherein said widths of said pulses of said modulated signal are wider than the recovery time of said non linear element.

16. The device of claim 1 wherein said widths of said pulses of said modulated signal are equal to said widths of said pulses of said patterned signal.

17. An all optical device for wavelength conversion, reshaping, modulating and regenerating, comprising:
a splitting device having first, second, third, and fourth terminals;
a nonlinear element;
an optical chopper; and
a coupling device, wherein said third and fourth terminals are associated with an optical loop including said coupling device and said nonlinear element, wherein said nonlinear element is displaced from a mid-point of said optical loop, wherein said optical chopper is arranged to receive a modulated signal and to produce therefrom a chopped modulated signal, wherein said splitting device is arranged to receive a continuous beam from one of said first and second terminals, wherein said coupling device arranged to couple said chopped modulated signal from said optical chopper into said optical loop and to generate a patterned signal based on said continuous beam at one of said first and second terminals, and wherein the widths of pulses of said patterned signal are substantially proportional to the widths of pulses of said modulated signal.

18. The device of claim 17 wherein said nonlinear element is displaced from said center of said optical loop by a distance equals to half of the spatial widths of the pulses of said chopped modulated signal.

19. The device of claim 17 wherein said widths of said pulses of said modulated signal are equal to said widths of said pulses of said patterned signal.

* * * * *